US009593634B2

(12) United States Patent
Nada

(10) Patent No.: US 9,593,634 B2
(45) Date of Patent: Mar. 14, 2017

(54) HEAT RELEASE RATE WAVEFORM GENERATING DEVICE AND COMBUSTION STATE DIAGNOSTIC SYSTEM FOR INTERNAL COMBUSTION ENGINE

(71) Applicant: Mitsuhiro Nada, Toyota (JP)

(72) Inventor: Mitsuhiro Nada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/779,877

(22) PCT Filed: Mar. 13, 2014

(86) PCT No.: PCT/IB2014/000312
§ 371 (c)(1),
(2) Date: Sep. 24, 2015

(87) PCT Pub. No.: WO2014/155170
PCT Pub. Date: Oct. 2, 2014

(65) Prior Publication Data
US 2016/0053702 A1 Feb. 25, 2016

(30) Foreign Application Priority Data

Mar. 27, 2013 (JP) .................................. 2013-066824

(51) Int. Cl.
*F02D 41/14* (2006.01)
*F02B 9/04* (2006.01)
(Continued)

(52) U.S. Cl.
CPC ............ *F02D 41/1473* (2013.01); *F02B 9/04* (2013.01); *F02B 23/0648* (2013.01);
(Continued)

(58) Field of Classification Search
CPC .... F02D 35/02; F02D 35/023; F02D 41/1473; F02D 41/403; F02B 9/04;
(Continued)

(56) References Cited

U.S. PATENT DOCUMENTS 5,664,540 A * 9/1997 Matsuoka ............. F02B 19/165
123/254
7,610,895 B2 * 11/2009 Klingebiel .............. F01P 7/167
123/299
(Continued)

FOREIGN PATENT DOCUMENTS

EP 2 541 030 A1 1/2013
JP 2011-58377 A 3/2011
(Continued)

OTHER PUBLICATIONS

International Search Report issued Jun. 25, 2014 in PCT/IB2014/000312.
(Continued)

*Primary Examiner* — John Kwon
*Assistant Examiner* — Johnny H Hoang
(74) *Attorney, Agent, or Firm* — Oblon, McClelland, Maier & Neustadt, L.L.P.

(57) ABSTRACT

In a diesel engine, an inside of a cylinder is divided into intra-cavity and extra-cavity regions. Ideal heat release rate waveform models, each formed of an isosceles triangle in which each oblique line gradient is a reaction rate, an area is a reaction amount and a base length is a reaction period with a reaction start temperature as a base point, are generated respectively for a vaporization reaction, low-temperature oxidation reaction, thermal decomposition reaction and high-temperature oxidation reaction of injected fuel for each region. An ideal heat release rate waveform of the reaction modes is generated by smoothing the ideal heat release rate (Continued)

waveform models through filtering and combining the ideal heat release rate waveforms, and is compared with an actual heat release rate waveform obtained from a detected in-cylinder pressure. A reaction mode having a deviation larger than or equal to a predetermined amount is diagnosed as being abnormal.

20 Claims, 20 Drawing Sheets

(51) Int. Cl.
  *F02D 41/40* (2006.01)
  *F02D 35/02* (2006.01)
  *F02B 23/06* (2006.01)
  *F01B 3/06* (2006.01)

(52) U.S. Cl.
  CPC ...... *F02B 23/0669* (2013.01); *F02B 23/0672* (2013.01); *F02D 35/02* (2013.01); *F02D 35/023* (2013.01); *F02D 41/403* (2013.01); *F01B 3/06* (2013.01); *F02M 26/05* (2016.02); *Y02T 10/125* (2013.01); *Y02T 10/44* (2013.01)

(58) Field of Classification Search
  CPC .............. F02B 23/0648; F02B 23/0669; F02B 23/0672; F01B 3/06; F02M 25/05; Y02T 10/125; Y02T 10/44
  USPC .... 123/46 A, 48 R, 294, 295, 299, 300, 269, 123/270, 285, 286; 701/102–104, 701/113–115
  See application file for complete search history.

(56) References Cited

U.S. PATENT DOCUMENTS

| | | | | |
|---|---|---|---|---|
| 8,682,568 | B2* | 3/2014 | Shimo | F02D 41/3035 123/299 |
| 2011/0192367 | A1* | 8/2011 | Reitz | F02B 23/0669 123/1 A |
| 2011/0271931 | A1* | 11/2011 | Rothbauer | F02B 23/0636 123/279 |
| 2012/0016571 | A1* | 1/2012 | Nada | F02D 41/3035 701/104 |
| 2012/0143479 | A1* | 6/2012 | Nada | F02D 41/3029 701/104 |
| 2013/0138328 | A1* | 5/2013 | Shimo | F02D 41/062 701/104 |
| 2014/0172277 | A1* | 6/2014 | Klett | F02D 41/345 701/105 |

FOREIGN PATENT DOCUMENTS

| | | |
|---|---|---|
| JP | 2011-58440 A | 3/2011 |
| JP | 2011-106334 A | 6/2011 |
| JP | 2012-154244 A | 8/2012 |
| JP | 2012-197677 A | 10/2012 |
| WO | WO 2012/127569 A1 | 9/2012 |
| WO | WO 2012/131950 A1 | 10/2012 |

OTHER PUBLICATIONS

T. Cerri et al., "1D Engine Simulation of a Small HSDI Diesel Engine Applying a Predictive Combustion Model", Journal of Engineering for Gas Turbines and Power, vol. 130, No. 1, XP008169870, Jan. 2008, 10 pages.
Partial English Translation of Japanese Office Action issued Aug. 9, 2016 in Japanese Patent Application No. 2013-066824.

* cited by examiner

EXTRA-CAVITY INJECTION
IDEAL HEAT RELEASE RATE WAVEFORM MODELS

CRANK ANGLE

EXTRA-CAVITY INJECTION
IDEAL HEAT RELEASE RATE WAVEFORM

CRANK ANGLE

INTRA-CAVITY INJECTION
IDEAL HEAT RELEASE RATE WAVEFORM MODELS

INTRA-CAVITY INJECTION
IDEAL HEAT RELEASE RATE WAVEFORM

IN-CYLINDER IDEAL HEAT RELEASE RATE WAVEFORM

CRANK ANGLE

ACTUAL HEAT RELEASE RATE WAVEFORM

IN-CYLINDER IDEAL HEAT RELEASE RATE WAVEFORM

CRANK ANGLE

FLOW OF SPRAY

HEAT RELEASE RATE WAVEFORM GENERATING DEVICE AND COMBUSTION STATE DIAGNOSTIC SYSTEM FOR INTERNAL COMBUSTION ENGINE

BACKGROUND OF THE INVENTION

1. Field of the Invention

The invention relates to a device that generates a heat release rate waveform of a compression self-ignition internal combustion engine, typically, a diesel engine, and a system that diagnoses an actual combustion state by utilizing the generated heat release rate waveform.

2. Description of Related Art

As is conventionally known, in a diesel engine (hereinafter, which may also be simply referred to as engine) that is used as an automobile engine, or the like, a control map is generated by obtaining suitable values of various control parameters, such as a fuel injection amount, based on an engine operating state that is determined on the basis of a rotation speed and load of the engine through an experiment or simulation, and these are stored in an engine control electronic control unit (engine ECU). The engine ECU is configured to control the engine while referencing suitable values on the control map.

When the control parameters are corrected on the basis of the engine operating state, it is desirable that a reaction state of fuel in a cylinder (for example, ignition timing, or the like, of fuel; hereinafter, which may also be referred to as combustion state) be recognized and the control parameters be corrected accordingly such that a desired reaction state is obtained.

One of means for correcting the control parameters on the basis of the reaction state of fuel in the cylinder in this way is known as described in, for example, Japanese Patent Application Publication No. 2011-106334 (JP 2011-106334 A), in which a heat release rate waveform at the time of combustion is obtained and then the control parameters are corrected such that the heat release rate waveform becomes an ideal waveform.

However, in an existing method of generating an ideal heat release rate waveform, sufficient accuracy based on an in-cylinder environment, such as an in-cylinder gas temperature, is not obtained, and sufficient reliability is not obtained, for example, when an actual combustion state is diagnosed by utilizing the ideal heat release rate waveform.

The inventors of the invention considered the reason for that. The inventors focused on the fact that, in the existing technique, it is a cause of the above inconvenience that the in-cylinder gas temperature is uniformed, that is, the overall in-cylinder gas temperature is regarded as being uniform, and the combustion state (heat release rate waveform) is determined on the basis of the in-cylinder average gas temperature by treating the entire in-cylinder as one combustion region. That is, the inventors focused on the fact that temperature fields that significantly deviate from the in-cylinder average gas temperature may be present in the cylinder and these temperature differences cause a deviation, or the like, of ignition timing, and become an obstacle to determine an accurate combustion state (generate the ideal heat release rate waveform). The inventors found that it is effective to increase the reliability by dividing the inside of the cylinder into a plurality of regions and a combustion state is determined for each of these divided regions.

Japanese Patent Application Publication No. 2011-58377 (JP 2011-58377 A) describes estimating an in-cylinder gas temperature in view of the fact that a heat loss of in-cylinder gas varies among the regions inside the cylinder. However, in order to highly accurately define the combustion state inside the cylinder, it is insufficient to just take a heat loss into consideration.

SUMMARY OF THE INVENTION

The invention provides a heat release rate waveform generating device and a combustion state diagnostic system that are able to highly accurately determine a combustion state of fuel inside a cylinder of an internal combustion engine.

As the solution principle of the invention, by dividing a combustion region in the cylinder into an internal region inside a cavity of a piston and an external region outside the cavity of the piston and individually defining a combustion state in each region, it is possible to highly accurately generate a heat release rate waveform.

Specifically, an aspect of the invention provides a device that generates a heat release rate waveform of combustion in a cylinder through self-ignition of fuel injected from a fuel injection valve into the cylinder in a compression self-ignition internal combustion engine. The heat release rate waveform generating device includes an electronic control unit configured to divide an inside of the cylinder into an internal region inside a cavity provided in a piston and an external region outside the cavity, the electronic control unit being configured to generate an ideal heat release rate waveform for at least one of the regions, the fuel injected from the fuel injection valve being present in the region.

In the heat release rate waveform generating device, the electronic control unit may be configured to generate the ideal heat release rate waveform by obtaining a reaction state of the fuel in the at least one of the regions, the fuel being present in the region, on the basis of an environment in the region.

In the heat release rate waveform generating device, the electronic control unit may be configured to generate an ideal heat release rate waveform by calculating a reaction rate, a reaction amount and a reaction period of each of a plurality of reactions of the fuel injected from the fuel injection valve for the at least one of the internal regions inside the cavity and the external region outside the cavity, the injected fuel being present in the region, on the basis of the environment in the region.

The "ideal heat release rate waveform" is a heat release rate waveform that should be theoretically obtained on the assumption that a fuel efficiency is sufficiently high in a state where a fuel injection amount based on a command injection amount, a fuel injection pressure based on a command injection pressure, and a fuel injection period based on a command injection period are ensured.

The "environment in the at least one of the regions" for obtaining a reaction state of the fuel is a temperature (parameter that determines the reaction start timing) in the at least one of the regions, an oxygen density (oxygen concentration) or a fuel density (parameter that determines the reaction rate or the reaction amount) in the at least one of the regions, or the like.

Here, when the fuel injected from the fuel injection valve is present only in the internal region inside the cavity, an ideal heat release rate waveform is generated for the internal region inside the cavity, and an ideal heat release rate waveform is not generated for the external region outside the cavity or a heat release rate of the ideal heat release rate waveform is set to be continuously "0" for the external region outside the cavity. When the fuel injected from the fuel injection valve is present only in the external region outside the cavity, an ideal heat release rate waveform is generated for the external region outside the cavity, and an ideal heat release rate waveform is not generated for the internal region inside the cavity or a heat release rate of the ideal heat release rate waveform is set to be continuously "0" for the internal region inside the cavity. In addition, when the fuel injected from the fuel injection valve is present in both the internal region inside the cavity and the external region outside the cavity, an ideal heat release rate waveform is individually generated for each of these internal region inside the cavity and external region outside the cavity.

With these configurations, for each of the internal region inside the cavity and the external region outside the cavity, in which the physical quantity, such as a temperature and a fuel density, may be different from each other, the reaction state (the reaction rate, reaction amount and reaction period of each of the plurality of reactions) of the fuel injected to each region is individually obtained on the basis of an environment in that region, and the ideal heat release rate waveform is generated individually. Therefore, in comparison with the existing technique for determining the combustion state (heat release rate waveform) by uniforming the gas temperature, or the like, of all the inside of the cylinder, it is possible to further accurately determine the reaction state of the fuel in each region, so it is possible to obtain high reliability on the generated ideal heat release rate waveform.

The "generating an ideal heat release rate waveform" in the invention is not limited to actually drawing an ideal heat release rate waveform, and is, for example, a concept that includes a situation that a heat release amount per unit rotation angle of the crankshaft is in a determined state to such a degree that an ideal heat release rate waveform is allowed to be generated.

In the heat release rate waveform generating device, the plurality of reactions of the fuel may include a vaporization reaction, a low-temperature oxidation reaction, a thermal decomposition reaction and a high-temperature oxidation reaction.

In this way, by obtaining the ideal heat release rate waveform in advance' for each of the vaporization reaction, the low-temperature oxidation reaction, the thermal decomposition reaction and the high-temperature oxidation reaction, it is possible to individually determine each reaction mode. For example, when the ideal heat release rate waveform is utilized to diagnose a combustion state (described later), it is possible to determine whether there is an abnormality in any reaction by comparing each of the ideal heat release rate waveforms with the actual heat release rate waveform. Particularly, the vaporization reaction and the thermal decomposition reaction are endothermic reactions (there is the case where the thermal decomposition reaction is an exothermic reaction), and it is possible to diagnose whether there is an abnormality in any one of the reaction rate, the reaction amount and the reaction period for the endothermic reaction, so it is possible to improve the accuracy of diagnosis. A usage mode of the ideal heat release rate waveform obtained for each of the reactions is not limited to a diagnosis of a combustion state, but the usage mode may also be designing the internal combustion engine, acquiring an optimal value of the control parameter, or the like.

In the heat release rate waveform generating device, the electronic control unit may be configured to further subdivide the internal region inside the cavity to obtain ideal heat release rate waveforms. That is, the electronic control unit may be configured to further divide the internal region inside the cavity into an intra-cavity first fuel density region that is a region near the fuel injection valve and an intra-cavity second fuel density region that is a region farther from the fuel injection valve than the intra-cavity first fuel density region. The electronic control unit may be configured to obtain an ideal heat release rate waveform by calculating a reaction rate, a reaction amount and a reaction period of each reaction for each of these intra-cavity first fuel density region and intra-cavity second fuel density region on the basis of an environment in the corresponding region.

Similarly, in the heat release rate waveform generating device, the electronic control unit may be configured to further subdivide the external region outside the cavity to obtain ideal heat release rate waveforms. That is, the electronic control unit may be configured to further divide the external region outside the cavity into an extra-cavity first fuel density region that is a region near the fuel injection valve and an extra-cavity second fuel density region that is a region farther from the fuel injection valve than the extra-cavity first fuel density region. The electronic control unit may be configured to obtain an ideal heat release rate waveform by calculating a reaction rate, a reaction amount and a reaction period of each reaction for each of these extra-cavity first fuel density region and extra-cavity second fuel density region on the basis of an environment in the corresponding region.

When the fuel injection amount is relatively large, the fuel injected from the fuel injection valve has a long air distance due to its penetration force, and main spray mass of fuel spray reaches a region far from the fuel injection valve. Therefore, the fuel density is low in the region near the fuel injection valve, and the fuel density is high in the region farther from the fuel injection valve than the above region. Thus, there is a difference in combustion state between the regions due to a difference in fuel density. In this solving means, the region, for which an ideal heat release rate waveform is generated is further subdivided on the basis of the difference in combustion state. Thus, it is possible to further accurately determine the reaction mode of the fuel in each region. As a result, it is possible to obtain high reliability on the obtained ideal heat release rate waveform.

In the heat release rate waveform generating device, the electronic control unit may be configured to generate an ideal heat release rate waveform for all the inside of the cylinder by combining ideal heat release rate waveforms of the regions for which the corresponding ideal heat release rate waveform is obtained.

Thus, in comparison with the existing technique for determining the heat release rate waveform by uniforming the gas temperature, or the like, of all the inside of the cylinder, the generated ideal heat release rate waveform for all the inside of the cylinder has a high reliability.

In the heat release rate waveform generating device, the electronic control unit may be configured to obtain an amount of suspended unburned fuel in at least one of the regions, the fuel injected from the fuel injection valve being present in the region, the electronic control unit being configured to generate an ideal heat release rate waveform by obtaining a reaction state of the fuel based on an environment in the region on the basis of an effective amount of the fuel, the effective amount of the fuel being obtained by subtracting the amount of the suspended unburned fuel from an amount of the fuel in the region, the fuel is present in the region.

Thus, the ideal heat release rate waveform is generated on the basis of the amount of the fuel that contributes to an actual reaction, so it is possible to further highly accurately generate the heat release rate waveform.

In the heat release rate waveform generating device, the electronic control unit may be configured to set reaction start temperatures as reaction start points of the respective reactions in advance, the electronic control unit being configured to set start timing of each reaction to timing at which a temperature in a target one of the internal region inside the cavity and the external region outside the cavity has reached the reaction start temperature in the corresponding region.

In the heat release rate waveform generating device, the electronic control unit may be configured to calculate the reaction rate from a reference reaction rate efficiency, corresponding to the reaction start temperature at the start timing of the reaction, and an amount of the fuel. The electronic control unit may be configured to calculate the reaction amount from a reference reaction amount efficiency, corresponding to the reaction start temperature, and the amount of the fuel, and the electronic control unit may be configured to calculate the reaction period from the reaction rate and the reaction amount.

Here, the reference reaction rate efficiency corresponds to a gradient of a rate of the amount of heat that is generated per unit fuel. For example, the reaction rate is calculated by multiplying the reference reaction rate efficiency by the amount of the fuel (effective amount of the fuel that is utilized in the reaction). The reference reaction amount efficiency corresponds to the amount of heat that is generated per unit fuel. For example, the reaction amount is calculated by multiplying the reference reaction amount efficiency by the amount of the fuel (the effective amount of the fuel that is utilized in the reaction).

In the heat release rate waveform generating device, the electronic control unit may be configured to obtain the reaction rate by multiplying a reference reaction rate by a rotation speed correction coefficient based on an engine rotation speed, the reference reaction rate being obtained by multiplying the reference reaction rate efficiency by the amount of the fuel. The electronic control unit may be configured to obtain the rotation speed correction coefficient by using "(Reference rotation speed/Actual rotation speed)$^2$".

With this configuration, even when the gas composition, or the like, inside the cylinder varies, the reaction rate is allowed to be obtained as a value that depends on a period of time, so it is possible to increase the calculation accuracy.

In the heat release rate waveform generating device, the electronic control unit may be configured to generate the ideal heat release rate waveform by generating ideal heat release rate waveform models, each of the ideal heat release rate waveform models being formed of a triangle, each formed of a triangle in which a gradient of each oblique line is the reaction rate, an area is the reaction amount and the length of a base is the reaction period, the start timing of each reaction being set for a base point, and the ideal heat release rate waveform being generated by smoothing the ideal heat release rate waveform models of the reactions by filtering.

By generating the heat release rate waveform model approximated to each triangle in this way and generating the ideal heat release rate waveform by utilizing the corresponding heat release rate waveform model, it is possible to simplify arithmetic processing for the generation, so it is possible to reduce the load on computing means, such as an ECU.

In the heat release rate waveform generating device, the electronic control unit may be configured to set a precedence order of a condition for determining a reaction state of the fuel such that the precedence order becomes higher as a control flexibility decreases. The precedence order may be an order of a temperature in the region, an amount of oxygen in the region and an amount of the fuel in the region.

For example, the temperature inside the at least one of the regions depends on the reaction start temperature, the compression gas temperature (which fluctuates with an intake air temperature), a preheating amount (which fluctuates with the fuel injection amount, or the like). The amount of oxygen in the region depends on the supercharging rate of intake air and the EGR rate.

Another aspect of the invention provides a system that diagnoses a combustion state by utilizing the ideal heat release rate waveform obtained by the above-described heat release rate waveform generating device. The combustion state diagnostic system includes an electronic control unit configured to compare the ideal heat release rate waveform with an actual heat release rate waveform at the time when the fuel has actually reacted in the cylinder, the electronic control unit being configured to diagnose that there is an abnormality in the reaction of the fuel when a deviation of the actual heat release rate waveform from the ideal heat release rate waveform is larger than or equal to a predetermined amount.

Further another aspect of the invention provides a combustion state diagnostic system for an internal combustion engine as follows. The combustion state diagnostic system includes an electronic control unit configured to compare the ideal heat release rate waveform with an actual heat release rate waveform at the time when the fuel has actually reacted in the cylinder in each of the reactions, the electronic control unit being configured to diagnose that there is an abnormality in the reaction when there is the reaction in which a deviation of the actual heat release rate waveform from the ideal heat release rate waveform is larger than or equal to a predetermined amount.

In the combustion state diagnostic system, the electronic control unit may be configured to obtain the actual heat release rate waveform on the basis of an in-cylinder pressure that is detected by an in-cylinder pressure sensor.

The "abnormality in the reaction" is not limited to a reaction abnormality (such as a failure of a device) to such a degree that the operation of the internal combustion engine is impaired, and also includes the case where there is a deviation in the heat release rate waveform to such a degree that the control parameter of the internal combustion engine is allowed to be corrected (or learned) (for example, correction for suppressing exhaust emission or combustion sound to the restricted range is possible).

With this configuration, in each of the plurality of reactions (reaction modes) of the fuel, when the actual heat release rate waveform deviates from the ideal heat release rate waveform by a predetermined amount or larger, it is diagnosed that there is an abnormality in that reaction. That is, each of the reactions of the fuel is different in characteristic (the reaction start temperature, the reaction rate, or the like) from each other, so it is possible to highly accurately identify the reaction having an abnormality by comparing an ideal characteristic of each reaction with the characteristic of the actually obtained (actually measured) actual heat release rate waveform. Therefore, it is possible to improve the accuracy of diagnosis. By taking a remedial measure (for example, correcting the control parameter of the internal combustion engine) for the reaction mode diagnosed to be abnormal, it is allowed to select the control parameter suitable for the reaction mode diagnosed to be abnormal and correct the control parameter. Therefore, it is possible to significantly improve the controllability of the internal combustion engine.

In the combustion state diagnostic system, at the time when there is the reaction in which the deviation of the actual heat release rate waveform from the ideal heat release rate waveform is larger than or equal to a predetermined abnormality determination deviation and the electronic control unit has diagnosed that there is an abnormality in that reaction, the electronic control unit may be configured to execute control for reducing the deviation to a deviation below the abnormality determination deviation by correcting a control parameter of the internal combustion engine when the deviation of the actual heat release rate waveform from the ideal heat release rate waveform is smaller than or equal to a predetermined correctable deviation, and the electronic control unit may be configured to diagnose that there is a failure in the internal combustion engine when the deviation of the actual heat release rate waveform from the ideal heat release rate waveform exceeds the correctable deviation.

In this way, when it is diagnosed that there is an abnormality in any reaction, it is determined whether the abnormality is resolvable on the basis of the deviation of the actual heat release rate waveform from the ideal heat release rate waveform. Therefore, it is possible to accurately distinguish a state where a normal reaction state is obtained by correcting the control parameter from a state where maintenance, such as replacement of parts, is required.

The control parameter in the case where control for reducing the deviation to a deviation below the abnormality determination deviation by correcting the control parameter of the internal combustion engine is executed is the amount of oxygen or the amount of the fuel in the cylinder. The amount of oxygen in the cylinder is determined by the oxygen density, and is adjustable by the EGR rate, the supercharging rate of intake air, or the like. The amount of the fuel in the cylinder is determined by the fuel density, and is adjustable by the fuel injection timing, the fuel injection pressure, or the fuel injection amount. On the other hand, an example of the case where it is diagnosed that there is a failure in the internal combustion engine is the case where the deviation of the actual heat release rate waveform exceeds the correctable deviation. In this case, the correction amount of the control parameter of the internal combustion engine exceeds a predetermined limit value, so it is allowed to diagnose that there is a failure in the internal combustion engine. Specifically, a lower limit value of each of the in-cylinder temperature, oxygen density and fuel density is set in advance, and when any one of these in-cylinder temperature, oxygen density and fuel density is lower than the corresponding lower limit value, it is determined that the correction amount of the control parameter of the internal combustion engine exceeds the predetermined limit value, and it is diagnosed that there is a failure in the internal combustion engine.

Furthermore, the combustion state diagnostic system may be implemented in a vehicle or may be mounted on an experimental apparatus.

With the above-described heat release rate waveform generating device and combustion state diagnostic system according to the invention, the space inside the cylinder is divided into the internal region inside the cavity and the external region outside the cavity and then the ideal heat release rate waveform is obtained for each of the regions, with the result that it is possible to obtain high reliability on the ideal heat release rate waveform. When an abnormality of a combustion state is diagnosed by utilizing the ideal heat release rate waveform, it is possible to improve the accuracy of diagnosis.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings. In the present embodiments, the case where a combustion state diagnostic system according to the invention is installed in a common-rail in-cylinder direct-injection multi-cylinder (for example, in-line four-cylinder) diesel engine (compression self-ignition internal combustion engine) mounted on an automobile (implemented in a vehicle) will be described.

Figure 1:
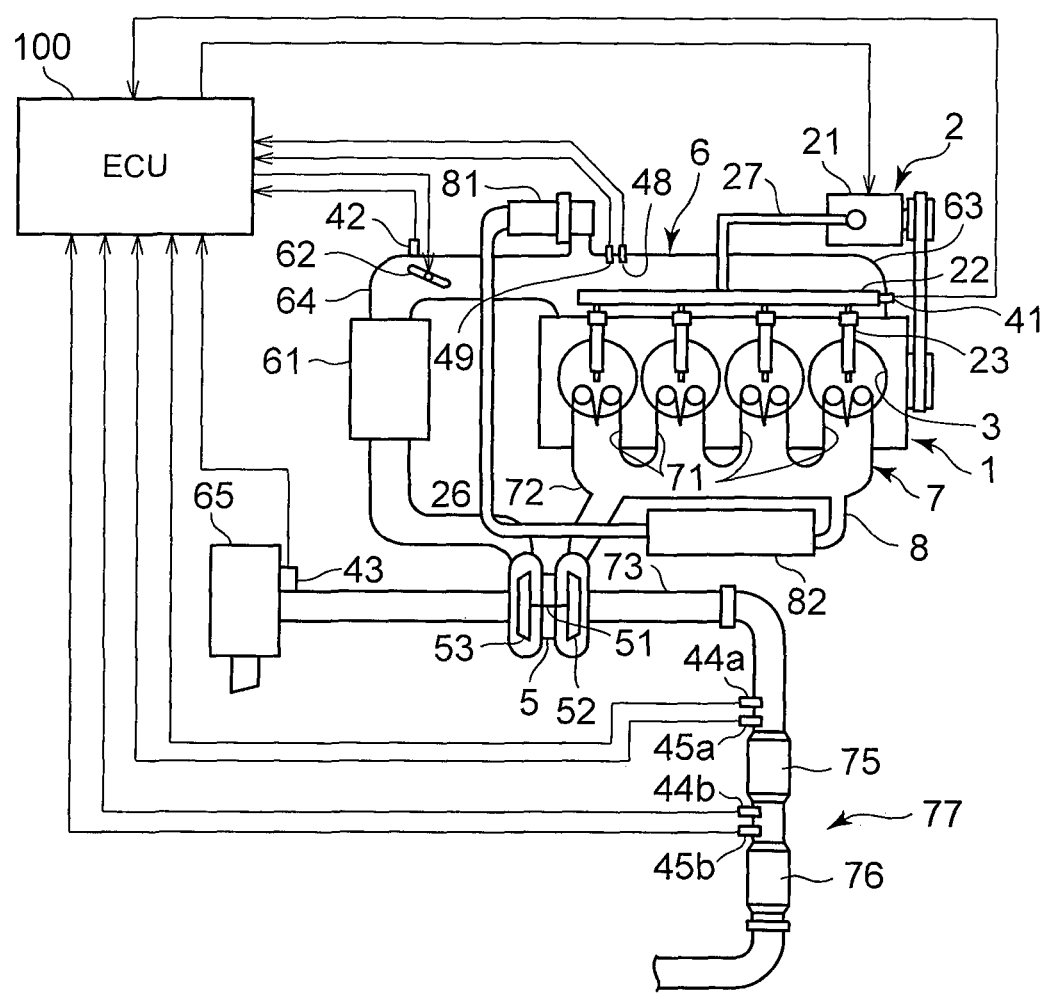
FIG. 1 is a view that shows the schematic configuration of a diesel engine and its control system according to an embodiment.
Figure 2:
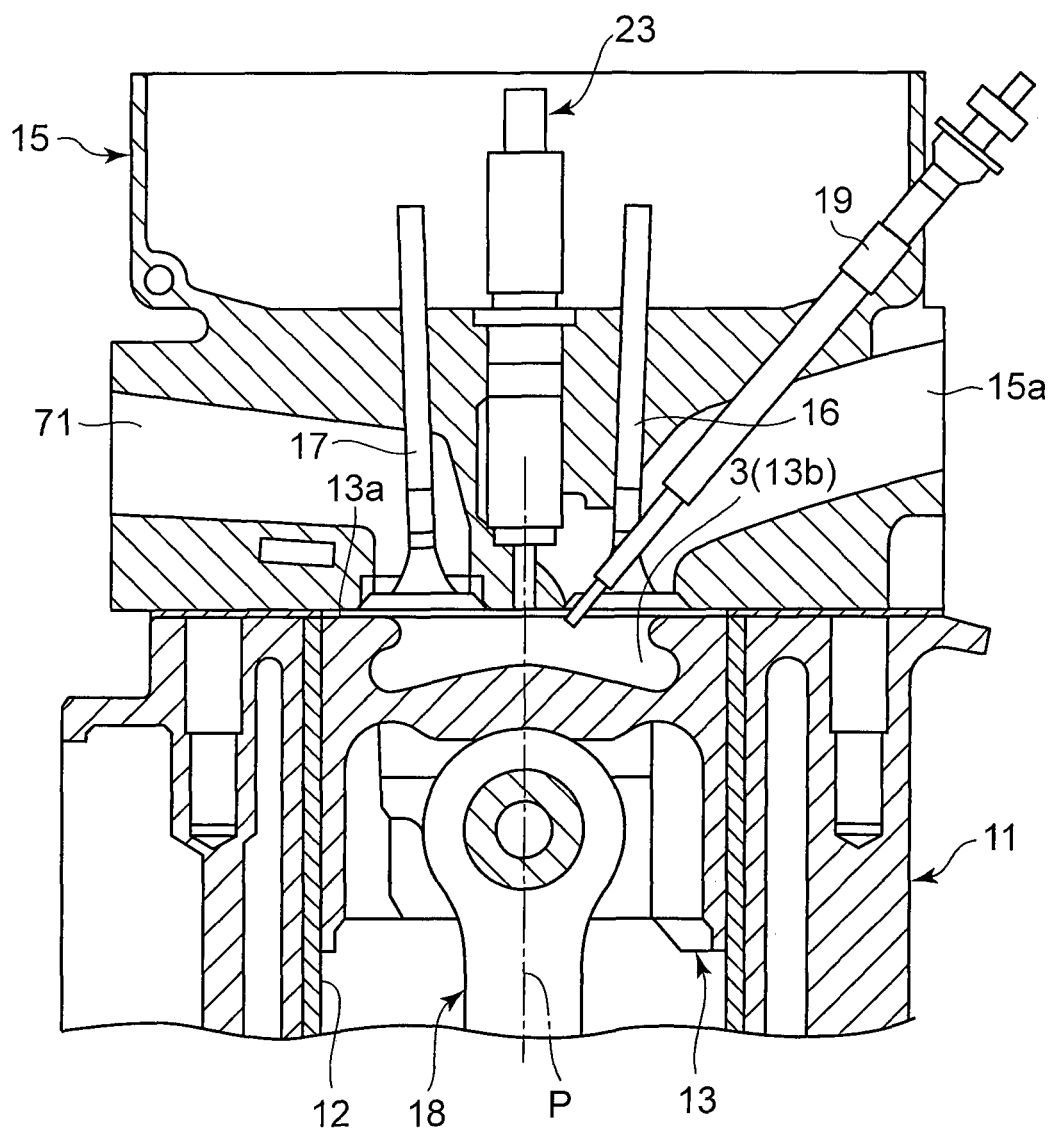
FIG. 2 is a cross-sectional view that shows each combustion chamber of the diesel engine and a peripheral portion thereof.

Initially, a first embodiment will be described. The configuration of the engine will be described. FIG. 1 is a schematic configuration view of the diesel engine 1 (hereinafter, simply referred to as engine) and its control system according to the present embodiment. FIG. 2 is a cross-sectional view that shows each combustion chamber 3 of the diesel engine 1 and its peripheral portion.

As shown in FIG. 1, the engine 1 according to the present embodiment is configured as a diesel engine system that includes a fuel supply system 2, the combustion chambers 3, an intake system 6, an exhaust system 7, and the like, as major components.

The fuel supply system 2 is configured to include a supply pump 21, a common rail 22, injectors (fuel injection valves) 23, an engine fuel passage 27, and the like.

The supply pump 21 draws fuel from a fuel tank, pressurizes the drawn fuel to a high pressure, and then supplies the high-pressure fuel to the common rail 22 via the engine fuel passage 27. The common rail 22 has the function of an accumulator that keeps the high-pressure fuel at a predetermined pressure (accumulates the high-pressure fuel), and distributes the accumulated high-pressure fuel to the injectors 23. Each of the injectors 23 includes a piezoelectric element inside, and is formed of a piezoelectric injector that opens as needed to inject and supply fuel into a corresponding one of the combustion chambers 3.

The intake system 6 includes an intake manifold 63 that is connected to intake ports 15a formed in a cylinder head 15 (see FIG. 2). An intake pipe 64 that constitutes an intake passage is connected to the intake manifold 63. An air cleaner 65, an air flow meter 43 and an intake throttle valve (diesel throttle) 62 are arranged in the intake passage from the upstream side. The air flow meter 43 outputs an electric signal based on the amount of air flowing into the intake passage via the air cleaner 65.

The exhaust system 7 includes an exhaust manifold 72 that is connected to exhaust ports 71 formed in the cylinder head 15. An exhaust pipe 73 that constitutes an exhaust passage is connected to the exhaust manifold 72. An exhaust gas purification unit 77 is arranged in the exhaust passage. The exhaust gas purification unit 77 includes an NOx storage reduction (NSR) catalyst (exhaust gas purification catalyst) 75 and a diesel particulate filter (DPF) 76. The NSR catalyst 75 serves as an NOx storage reduction catalyst. A diesel particulate-NOx reduction system (DPNR) catalyst may be applied as the exhaust gas purification unit 77.

Here, the configuration of each combustion chamber 3 of the engine 1 and its peripheral portion will be described with reference to FIG. 2. As shown in FIG. 2, a cylindrical cylinder bore 12 is formed cylinder by cylinder (each of four cylinders) in a cylinder block 11 that constitutes part of an engine, body, and a piston 13 is accommodated in each of the cylinder bores 12 so as to be slidable in an up-and-down direction.

Each combustion chamber 3 is formed on the upper side of a top face 13a of a corresponding one of the pistons 13. That is, each combustion chamber 3 is defined by the lower face of the cylinder head 15 connected to the upper portion of the cylinder block 11, the inner wall face of the corresponding cylinder bore 12, and the top face 13a of the corresponding piston 13. A cavity (recessed portion) 13b is recessed at substantially the center portion of the top face 13a of each piston 13. The cavity 13b also constitutes part of the corresponding combustion chamber 3.

The shape of each cavity 13b has a small recess depth at the center portion (along a cylinder center line P). The recess depth increases toward the outer peripheral side. That is, at the time when the piston 13 is located near the compression top dead center (TDC) as shown in FIG. 2, the combustion chamber 3 that is formed by the corresponding cavity 13b is configured such that a narrow small space having a relatively small volume is formed at the center portion and a space is gradually expanded (formed as an expanded space) toward the outer peripheral side.

Each of the pistons 13 is coupled to a crankshaft that is an engine output shaft by a corresponding connecting rod 18. Thus, reciprocal movement of each piston 13 inside the corresponding cylinder bore 12 is transmitted to the crankshaft via the corresponding connecting rod 18, and the crankshaft rotates. Thus, the engine output is obtained.

A glow plug 19 is oriented toward the corresponding combustion chamber 3. Each glow plug 19 is red hot by passing current immediately before the engine 1 starts, and part of fuel spray is sprayed toward the glow plug 19. Thus, each glow plug 19 functions as a start assisting device by which ignition and combustion are facilitated.

The intake ports 15a and the exhaust ports 71 are formed in the cylinder head 15. Intake valves 16 that respectively open or close the intake ports 15a and exhaust valves 17 that respectively open or close the exhaust ports 71 are arranged on the cylinder head 15. The injectors 23 that directly inject fuel into the corresponding combustion chambers 3 are installed at the cylinder head 15. Each of the injectors 23 is arranged at substantially the center upper portion of the corresponding combustion chamber 3 in an upright position along the cylinder center line, P, and fuel that is introduced from the common rail 22 is injected toward the corresponding combustion chamber 3 at predetermined timing.

Furthermore, as shown in FIG. 1, a turbocharger 5 is connected to the engine 1. The turbocharger 5 includes a turbine wheel 52 and a compressor wheel 53 coupled to each other via a turbine shaft 51. The compressor wheel 53 is arranged inside the intake pipe 64, and the turbine wheel 52 is arranged inside the exhaust pipe 73. Therefore, the turbocharger 5 carries out so-called supercharging operation such that the compressor wheel 53 is rotated by utilizing exhaust gas flow (exhaust gas pressure) received by the turbine wheel 52 and, as a result, intake air pressure is increased. The turbocharger 5 according to the present embodiment is a variable nozzle turbocharger. The turbocharger 5 includes a variable nozzle vane mechanism (not shown) at the turbine wheel 52 side, and is able to adjust the supercharging pressure of the engine 1 by adjusting the opening degree of the variable nozzle vane mechanism.

An intercooler 61 is provided in the intake pipe 64 of the intake system 6. The intercooler 61 is used to forcibly cool intake air of which the temperature is increased through supercharging at the turbocharger 5.

An exhaust gas recirculation passage (EGR passage) 8 is connected to the engine 1. The EGR passage 8 connects the intake system 6 to the exhaust system 7. The EGR passage 8 decreases a combustion temperature by recirculating part of exhaust gas to the intake system 6 as needed and supplying the part of exhaust gas to the combustion chambers 3 again. Thus, the EGR passage 8 reduces the amount of NOx produced. An EGR valve 81 and an EGR cooler 82 are provided in the EGR passage 8. The EGR valve 81 is steplessly opened or closed through electronic control, and is able to freely regulate the flow rate of exhaust gas flowing through the passage 8. The EGR cooler 82 is used to cool exhaust gas passing (recirculating) through the EGR passage 8. These EGR passage 8, EGR valve 81, EGR cooler 82, and the like, constitute an exhaust gas recirculation device (EGR device).

Next, sensors will be described. Various sensors are installed at portions of the engine 1, and output signals regarding the environmental conditions of the corresponding portions and the operating state of the engine 1.

For example, the air flow meter 43 outputs a detection signal corresponding to the flow rate of intake air (intake air amount) at a portion upstream of the intake throttle valve 62 in the intake system 6. A rail pressure sensor 41 outputs a detection signal corresponding to the pressure of fuel that is stored in the common rail 22. A throttle opening degree sensor 42 detects the opening degree of the intake throttle valve 62. An intake air pressure sensor 48 is arranged in the intake manifold 63, and outputs a detection signal corresponding to an intake air pressure. An intake air temperature sensor 49 is arranged in the intake manifold 63, and outputs a detection signal corresponding to the temperature of intake air. Air-fuel ratio (A/F) sensors 44a, 44b are respectively arranged at a portion upstream of the NSR catalyst 75 and a portion downstream of the NSR catalyst 75, and output detection signals that continuously vary with an oxygen concentration in exhaust gas. The arrangement location of the A/F sensor may be only a portion upstream of the NSR catalyst 75 or may be only a portion downstream of the NSR catalyst 75. Exhaust gas temperature sensors 45a, 45b are respectively similarly arranged at a portion upstream of the NSR catalyst 75 and a portion downstream of the NSR catalyst 75, and output detection signals corresponding to the temperatures of exhaust gas (exhaust gas temperatures). The arrangement location of the exhaust gas temperature sensor may be only a portion upstream of the NSR catalyst 75 or may be only a portion downstream of the NSR catalyst 75.

Figure 3:
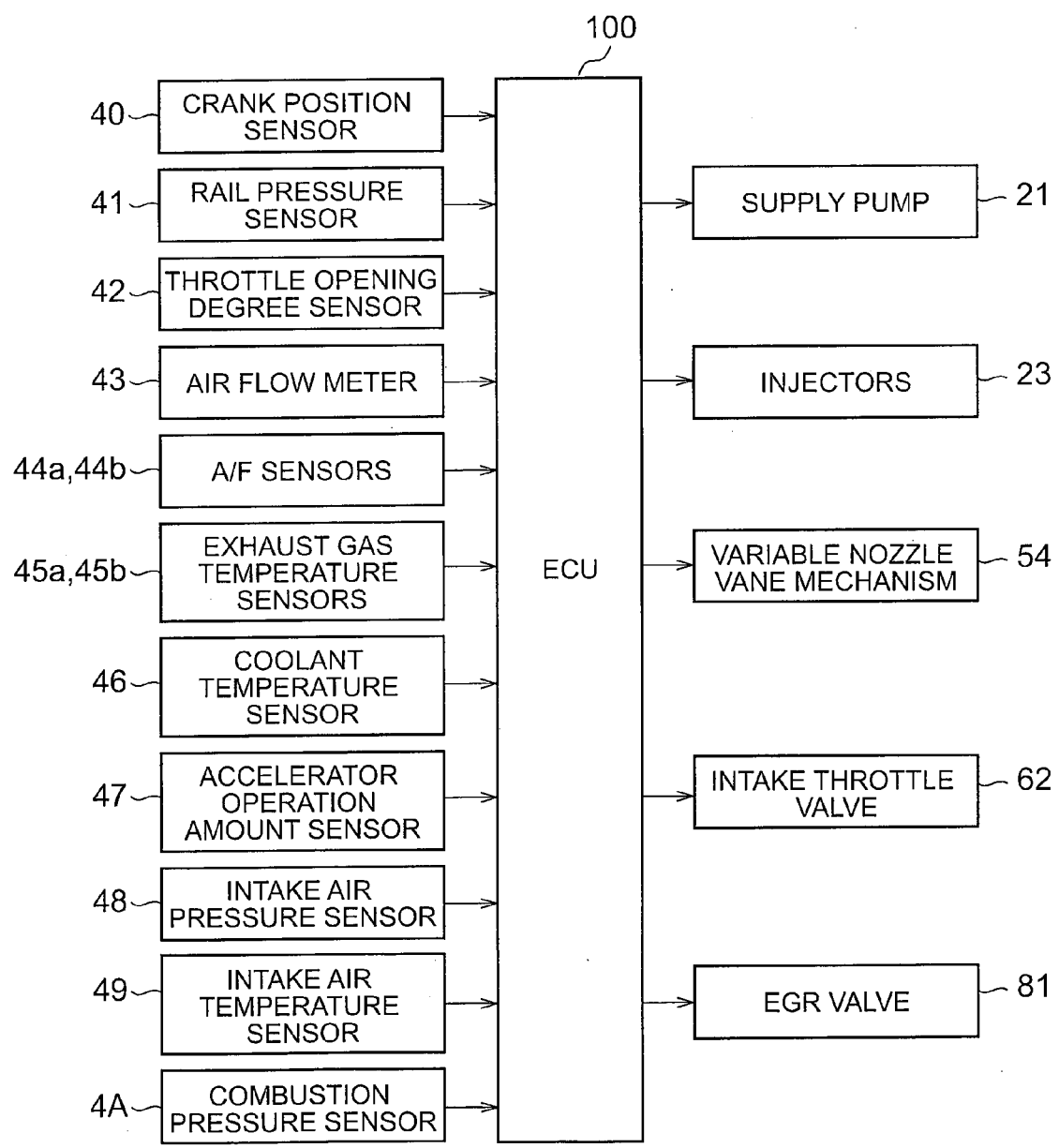
FIG. 3 is a block diagram that shows the configuration of the control system, such as an ECU, shown in FIG. 1.

Next, an electronic control unit (hereinafter, referred to as ECU) will be described. The ECU 100 includes a microcomputer and input/output circuits. The microcomputer is formed of a CPU, a ROM, a RAM, and the like (not shown). As shown in FIG. 3, a crank position sensor 40, the rail pressure sensor 41, the throttle opening degree sensor 42, the air flow meter 43, the A/F sensors 44q, 44b, the exhaust gas temperature sensors 45a, 45b, a coolant temperature sensor 46, an accelerator operation amount sensor 47, the intake air pressure sensor 48, the intake air temperature sensor 49, a combustion pressure sensor (CPS) 4A, and the like, are connected to the input circuit of the ECU 100. The crank position sensor 40 outputs a detection signal (pulse) each time the output shaft (crankshaft) of the engine 1 rotates a set angle. The coolant temperature sensor 46 outputs a detection signal corresponding to the coolant temperature of the engine 1. The accelerator operation amount sensor 47 outputs a detection signal corresponding to a depression amount of an accelerator pedal. The CPS 4A detects an in-cylinder pressure.

On the other hand, the supply pump 21, the injectors 23, the intake throttle valve 62, the EGR valve 81 and the variable nozzle vane mechanism (actuator that adjusts the opening degree of a variable nozzle vane) 54 of the turbocharger 5 are connected to the output circuit of the ECU 100.

The ECU 100 executes various controls over the engine 1 on the basis of outputs from the various sensors, computed values obtained through arithmetic expressions that utilize the output values, or various maps stored in the ROM.

For example, the ECU 100 carries out pilot injection (sub-injection) and main injection in fuel injection control over each of the injectors 23.

The pilot injection is an operation to inject fuel in a small amount in advance prior to the main injection from each injector 23. The pilot injection is an injection operation for leading to stable diffuse combustion by suppressing a delay of ignition of fuel through the main injection, and is also called sub-injection. The pilot injection in the present embodiment has not only the function of suppressing an initial combustion rate through the above-described main injection but also a preheating function of increasing the in-cylinder temperature. That is, after the pilot injection is carried out, fuel injection is once stopped, a compression gas temperature (in-cylinder temperature) is sufficiently increased to reach a self-ignition temperature (for example, 1000K) of fuel by the time when the main injection starts. Thus, the ignitability of fuel that is injected through the main injection is ensured favorably.

The main injection is an injection operation (operation to supply torque generating fuel) for generating the torque of the engine 1. An injection amount in the main injection is basically determined such that a required torque is obtained on the basis of the operating state, such as an engine rotation speed (engine speed), an accelerator operation amount, a coolant temperature and an intake air temperature. For example, the torque required value of the engine 1 is increased as the engine rotation speed (the engine rotation speed (engine speed) that is calculated on the basis of the detected value of the crank position sensor 40) increases and as the accelerator operation amount (the depression amount of the accelerator pedal, which is detected by the accelerator operation amount sensor 47) increases (as the accelerator operation amount increases). A larger fuel injection amount is set for the main injection accordingly.

In a specific example of a fuel injection mode, the pilot injection (fuel injection through a plurality of injection holes formed in each injector 23) is carried out before the corresponding piston 13 reaches the compression TDC, fuel injection is once stopped, and then the main injection is carried out at the timing at which the piston 13 has reached near the compression TDC after a lapse of a predetermined interval. Thus, fuel combusts through self-ignition, and the energy generated through the combustion is converted to kinetic energy for pushing the piston 13 downward toward the BDC (energy that becomes an engine output), thermal energy that increases the temperature in the corresponding combustion chamber 3 or thermal energy that is radiated to the outside (for example, coolant) via the cylinder block 11 or the cylinder head 15. A combustion mode of fuel injected through the main injection is different between fuel injected to the inside of the cavity 13b and fuel injected to the outside of the cavity 13b. The combustion modes of these fuels will be described later.

In addition to the above-described pilot injection and main injection, after-injection or post-injection is carried out where necessary. The functions of these injections are known, so the description is omitted here.

The ECU 100 controls the opening degree of the EGR valve 81 on the basis of the operating state of the engine 1, and adjusts the exhaust gas recirculation amount (EGR amount) toward the intake manifold 63. The EGR amount is set in accordance with an EGR map generated through an experiment, simulation, or the like, in advance and stored in the ROM. The EGR map is a map for determining the EGR amount (EGR rate) by using the engine rotation speed and the engine load as parameters.

A fuel injection pressure at the time of fuel injection depends on the internal pressure of the common rail 22 (common rail pressure). Generally, as the common rail internal pressure, a target value of fuel pressure that is supplied from the common rail 22 to the injectors 23, that is, a target rail pressure, is increased as the engine load increases and as the engine rotation speed increases. The target rail pressure is, for example, set in accordance with a fuel pressure setting map stored in the ROM. In the present embodiment, the fuel pressure is adjusted between 30 MPa and 200 MPa on the basis of the engine load, and the like.

Optimal values of fuel injection parameters for the pilot injection, the main injection, and the like, vary on temperature conditions of the engine 1, the intake air, and the like.

For example, the ECU 100 regulates a fuel displacement of the supply pump 21 such that the common rail pressure becomes equal to the target rail pressure that is set on the basis of the engine operating state, that is, the fuel injection pressure, coincides with a target injection pressure. The ECU 100 determines the fuel injection amount and the fuel injection mode on the basis of the engine operating state. Specifically, the ECU 100 calculates the engine rotation speed on the basis of the detected value of the crank position sensor 40, obtains the depression amount of the accelerator pedal (accelerator operation amount) on the basis of the detected value of the accelerator operation amount sensor 47, and determines a total fuel injection amount (the sum of an injection amount in pilot injection and an injection amount in main injection) on the basis of the engine rotation speed and the accelerator operation amount.

Figure 4:
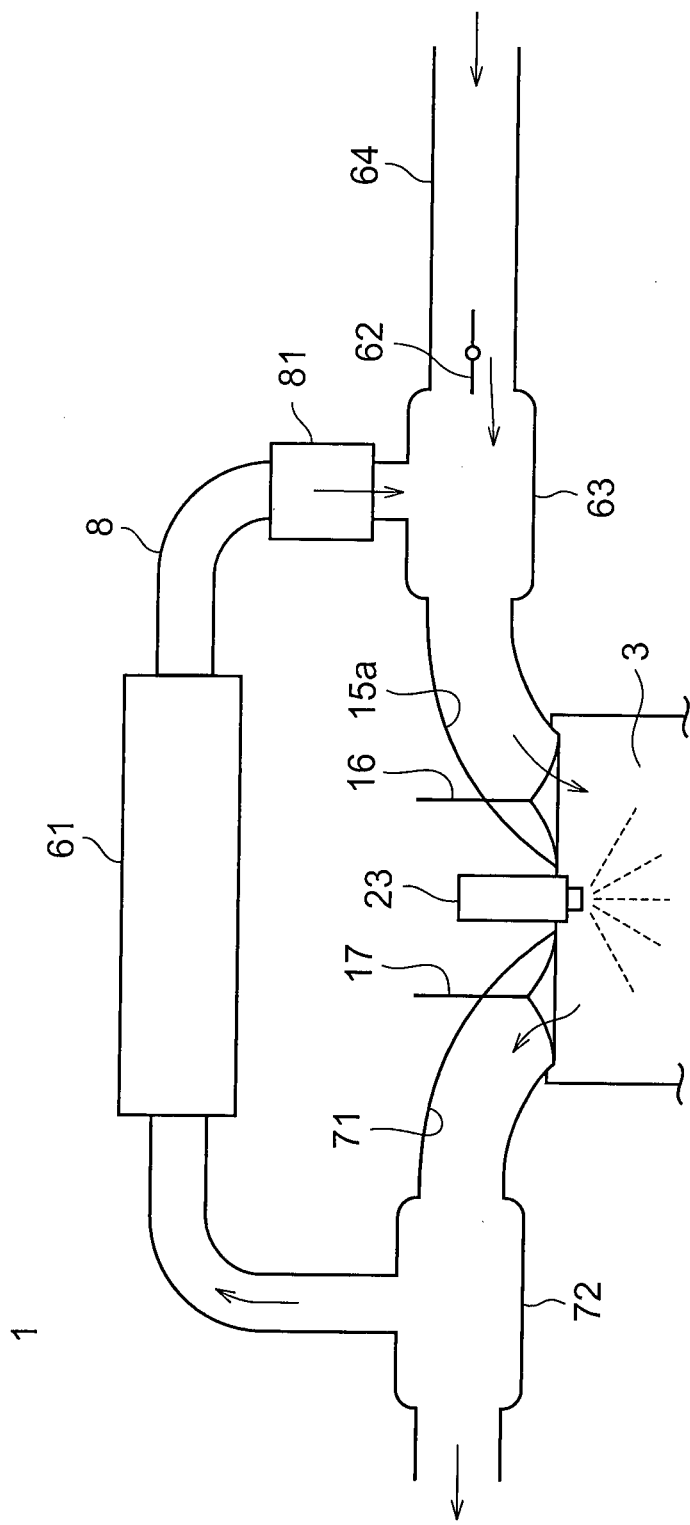
FIG. 4 is a schematic view of intake and exhaust systems and each combustion chamber for schematically illustrating a combustion mode in each combustion chamber of the diesel engine.

Next, the outline of the combustion mode inside each combustion chamber 3 in the engine 1 according to the present embodiment will be described. FIG. 4 is a view that schematically shows a state where gas (air) is introduced into one of the cylinders of the engine 1 via the intake manifold 63 and the corresponding intake port 15a, combustion is carried out by fuel injection from the corresponding injector 23 into the corresponding combustion chamber 3, and then the combusted gas is emitted to the exhaust manifold 72 via the corresponding exhaust port 71.

As shown in FIG. 4, gas that is introduced into the cylinder contains fresh air introduced from the intake pipe 64 via the intake throttle valve 62 and EGR gas that is introduced from the EGR passage 8 when the EGR valve 81 is open. The percentage (that is, EGR rate) of EGR gas amount to the sum of an introduced fresh air amount (mass) and an introduced EGR gas amount (mass) varies with the opening degree of the EGR valve 81. The EGR valve 81 is controlled by the ECU 100 as needed on the basis of the operating state.

Fresh air and EGR gas introduced in this way pass through the corresponding intake valve 16 that is open in the intake stroke, and are introduced into the cylinder with downward movement of the corresponding piston 13 (not shown in FIG. 4) to become in-cylinder gas. The in-cylinder gas is hermetically enclosed in the cylinder as the corresponding intake valve 16 is closed at the valve closing timing that is determined on the basis of the operating state of the engine 1 (in-cylinder gas enclosed state), and is compressed with upward movement of the corresponding piston 13 in the compression stroke thereafter. When the piston 13 reaches near the compression TDC, fuel is directly injected into the corresponding combustion chamber 3 as the corresponding injector 23 is opened for a predetermined period of time through injection amount control by the above-described ECU 100. For example, the pilot injection is carried at a predetermined crank angle position before the piston 13 reaches the compression TDC, fuel injection is once stopped, and then the main injection is carried out at the timing at which the piston 13 has reached near the compression TDC after a lapse of a predetermined interval.

Figure 5:
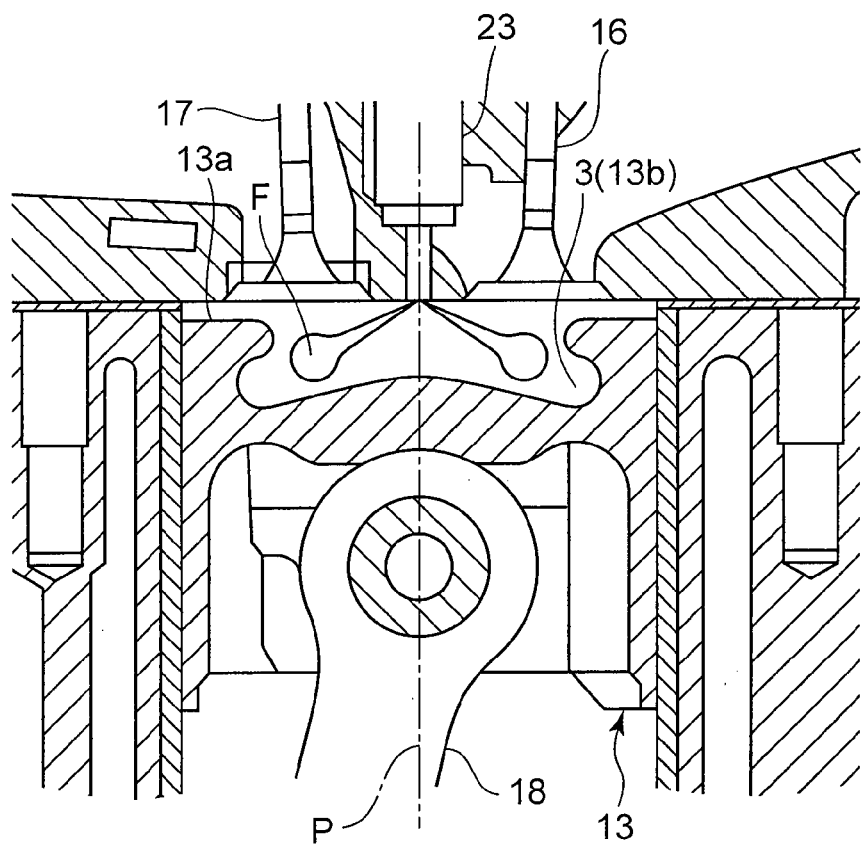
FIG. 5 is a cross-sectional view that shows each combustion chamber and its peripheral portion at the time of main injection of the diesel engine.
Figure 6:
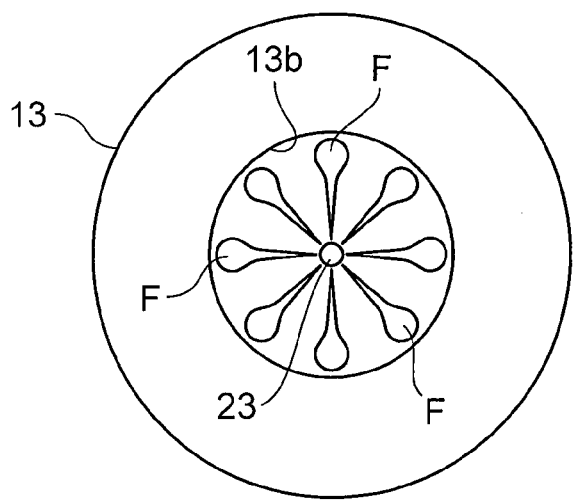
FIG. 6 is a plan view of each combustion chamber at the time of main injection of the diesel engine.

FIG. 5 is a cross-sectional view that shows each combustion chamber 3 and its peripheral portion at the time when the main injection is carried out. FIG. 6 is a plan view (view that shows the top face of the piston 13) of each combustion chamber 3 at the time of the fuel injection. FIG. 5 and FIG. 6 show a state where substantially the entire amount of fuel in the main injection is injected into the cavity 13b. As shown in FIG. 6, each injector 23 of the engine 1 according to the present embodiment has eight injection holes at equal intervals in the circumferential direction, and fuel is injected through these injection holes equally. The number of the injection holes is not limited to eight.

Figure 7:
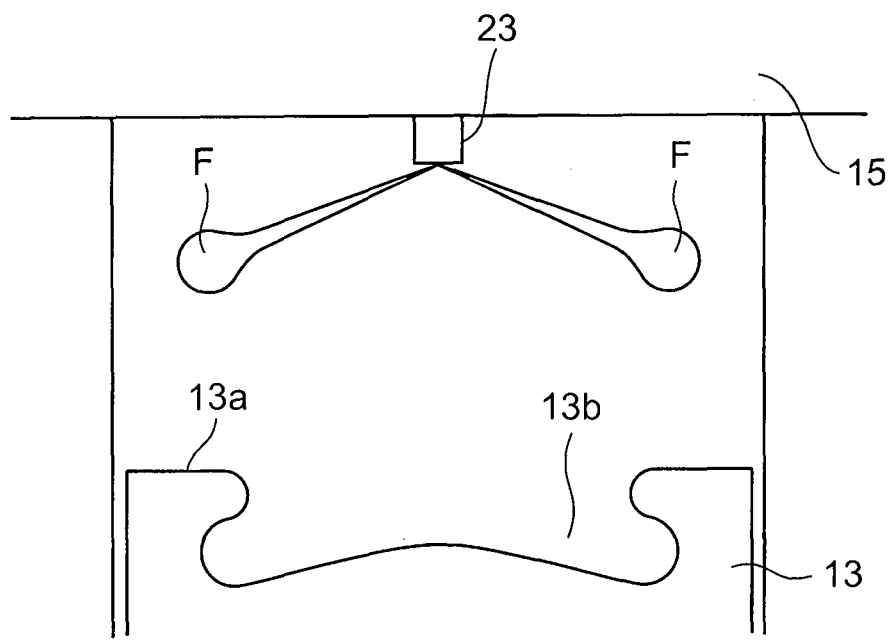
FIG. 7 is a schematic view of a portion around each combustion chamber, showing a state where substantially the entire amount of injected fuel of the diesel engine is injected toward an extra-cavity region.
Figure 8:
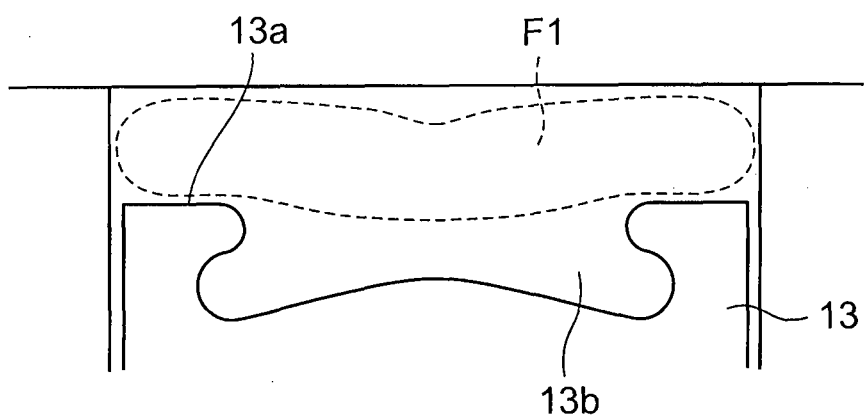
FIG. 8 is a view that shows a region in which spray is present in the case where a piston has moved to a location close to a compression top dead center (TDC) in a state where fuel has been injected into the extra-cavity region of the diesel engine.

Each of sprays F of fuel injected through the injection holes is diffused in a substantially conical shape. Generally, the pilot injection is carried out at a crank angle position that is advanced from the crank angle position at which the piston 13 reaches the compression TDC, and, for example, as shown in FIG. 7, substantially the entire amount of injected fuel is injected toward the region outside the cavity 13b (space between the top face 13a of the piston 13 and the lower face of the cylinder head 15; hereinafter, the space is referred to as "extra-cavity region"). This contributes to preheating of the extra-cavity region. FIG. 8 is a view that shows a region in which spray is present (spray is present in a region F1 surrounded by the dashed line in FIG. 8) in the case where the piston 13 has moved to near the compression TDC in a state where fuel has been injected to the extra-cavity region.

When the injection timing of the pilot injection (injection in a relatively small amount) is shifted to a retardation side and fuel is injected toward the internal space of the cavity 13b (hereinafter, the space is referred to as "intra-cavity region"), the intra-cavity region is allowed to be preheated. Depending on the injection period of the pilot injection, fuel may be injected toward the extra-cavity region in the first half of the injection period, and fuel may be injected toward the intra-cavity region in the second half of the injection period. At this time, the extra-cavity region and the intra-cavity region each are preheated.

Figure 9A:
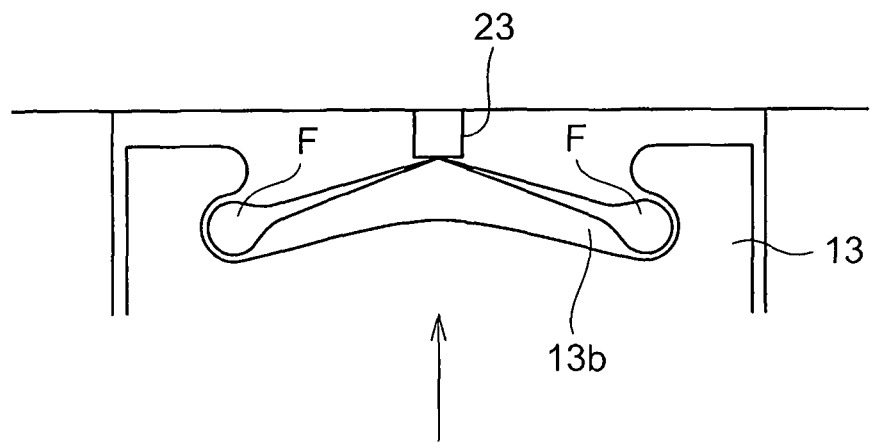
FIG. 9A is a schematic view of a portion around each combustion chamber, showing a state where substantially the entire amount of injected fuel is injected toward an intra-cavity region in the diesel engine, and is a view that shows a state where fuel is injected in a compression stroke in which the piston moves toward the compression TDC.
Figure 9B:
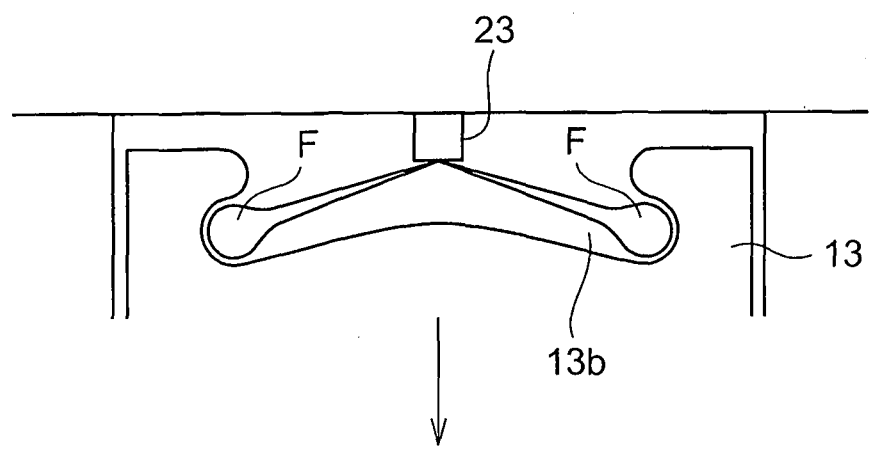
FIG. 9B is a schematic view of a portion around each combustion chamber, showing a state where substantially the entire amount of injected fuel is injected toward the intra-cavity region in the diesel engine, and is a view that shows a state where fuel is injected in an expansion stroke in which the piston moves toward a bottom dead center (BDC)

The main injection is carried out at a crank angle position at which the piston 13 has reached near the compression TDC, and, for example, as shown in FIG. 9A and FIG. 9B, generally, substantially the entire amount of injected fuel is injected toward the intra-cavity region. FIG. 9A shows a state at the time of fuel injection in the compression stroke in which the piston 13 moves toward the compression TDC. FIG. 9B shows a state at the time of fuel injection in the expansion stroke in which the piston 13 moves toward the BDC.

Figure 10:
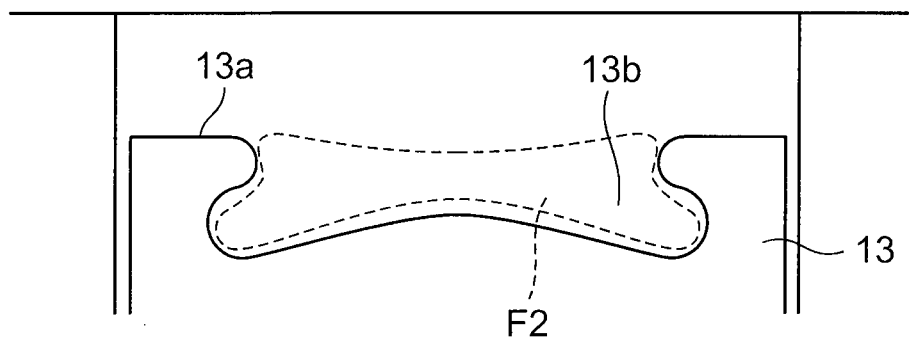
FIG. 10 is a view that shows a region in which spray is present at the time when fuel is injected into the intra-cavity region in the diesel engine.

FIG. 10 is a view that shows a region in which spray is present (spray is present in a region F2 surrounded by the dashed line in FIG. 10) at the time when fuel is injected to the intra-cavity region.

Not the entire amount of fuel that is injected through the main injection is always injected to the intra-cavity region. When early injection, or the like, is carried out, part of fuel may be injected to the extra-cavity region depending on the injection start timing or injection termination timing of the main injection. Hereinafter, the description will be specifically made.

Figure 11A:
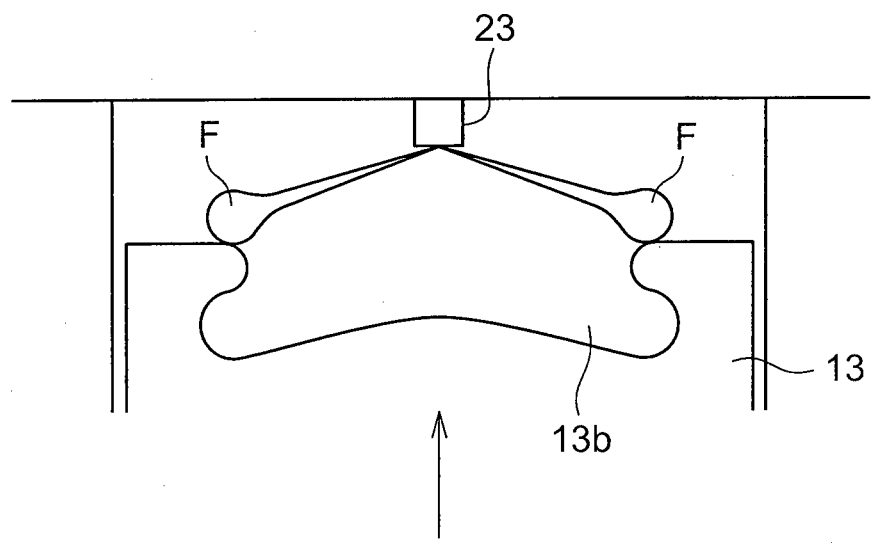
FIG. 11A is a schematic view of a portion around each combustion chamber, showing a state where substantially the entire amount of injected fuel is injected toward the extra-cavity region in the diesel engine, and is a view that shows a state where fuel is injected in the compression stroke in which the piston moves toward the compression TDC.
Figure 11B:
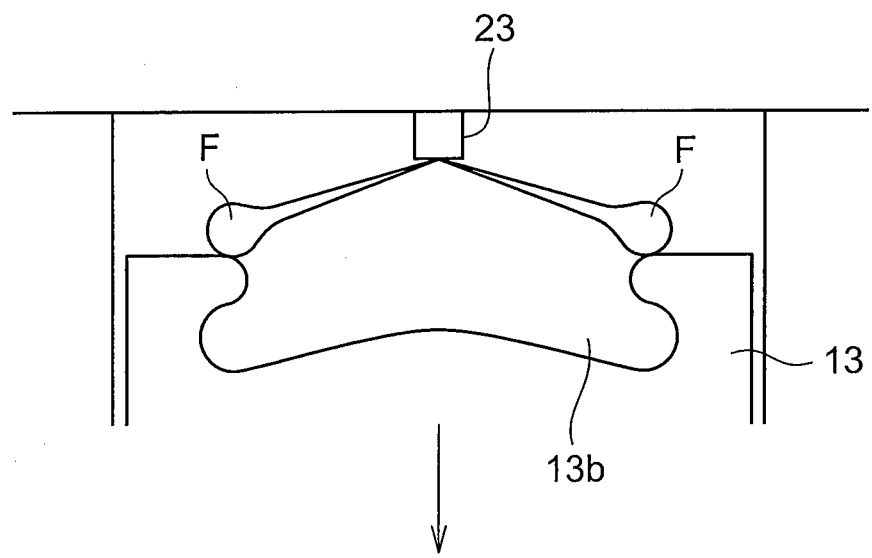
FIG. 11B is a schematic view of a portion around each combustion chamber, showing a state where substantially the entire amount of injected fuel is injected toward the extra-cavity region in the diesel engine, and is a view that shows a state where fuel is injected in the expansion stroke in which the piston moves toward the BDC.

For example, as shown in FIG. 11A (at the time of fuel injection in the compression stroke in which the piston 13 moves toward the compression TDC), when the main injection is started in a state where the piston 13 is located at a crank angle position that is advanced by a predetermined amount from the crank angle position at which the piston 13 reaches the compression TDC, fuel injected in the initial stage of the injection period of the main injection is injected toward the extra-cavity region. For example, as shown in FIG. 11B (at the time of fuel injection in the expansion stroke in which the piston 13 moves toward the BDC), when the main injection is continued to a state where the piston 13 is located at a crank angle position that is retarded by a predetermined amount from the crank angle position at which the piston 13 reaches the compression TDC, fuel injected in the last stage of the injection period of the main injection is injected toward the extra-cavity region.

In the piston position shown in FIG. 9A, when fuel is injected at a piston position advanced from this piston position, part of the injected fuel is injected toward the extra-cavity region, so the piston position shown in FIG. 9A may be termed intra-cavity injection advance limit. In the piston position shown in FIG. 9B, when fuel is injected at a piston position retarded from this piston position, part of the injected fuel is injected toward the extra-cavity region, so the piston position shown in FIG. 9B may be termed intra-cavity injection retardation limit.

In addition, in the piston position shown in FIG. 11A, when fuel is injected at a piston position retarded from this piston position, part of the injected fuel is injected toward the intra-cavity region, so the piston position shown in FIG. 11A may be termed extra-cavity injection retardation limit. In the piston position shown in FIG. 11B, when fuel is injected at a piston position advanced from this piston position, part of the injected fuel is injected toward the intra-cavity region, so the piston position shown in FIG. 11B may be termed extra-cavity injection advance limit.

The crank angle positions corresponding to the above-described intra-cavity injection advance limit (FIG. 9A), intra-cavity injection retardation limit (FIG. 9B), extra-cavity injection retardation limit (FIG. 11A) and extra-cavity injection advance limit (FIG. 11B) may be determined in advance on the basis of the engine specifications, a spray angle of fuel that is injected from the injector 23, and the like. For example, the spray angle of fuel is allowed to be calculated by known Hiroyasu's equation (by Dr. Hiroyuki Hiroyasu), and the crank angle positions corresponding to the respective limits are allowed to be obtained in advance from the spray angle and the engine specifications, such as the axial direction of each of the injection holes of the injector 23 and the shape of the cavity 13*b*. As an example, the extra-cavity injection retardation limit (FIG. 11A) is a position at 28° CA before the compression TDC in crank angle, and the intra-cavity injection advance limit (FIG. 9A) is a position at 18° CA before the compression TDC in crank angle. The intra-cavity injection retardation limit (FIG. 9B) is a position at 18° CA after the compression TDC in crank angle, and the extra-cavity injection advance limit (FIG. 11B) is a position at 28° CA after the compression TDC in crank angle. These limits are not limited to these values.

When fuel is injected only in a period between the intra-cavity injection advance limit (FIG. 9A) and the intra-cavity injection retardation limit (FIG. 9B), substantially the entire amount of injected fuel is injected toward the intra-cavity region. When fuel is injected in a period advanced from the extra-cavity injection retardation limit (FIG. 11A) or when fuel is injected in a period retarded from the extra-cavity injection advance limit (FIG. 11B), the injected fuel is injected toward the extra-cavity region.

When fuel is injected over a period from the extra-cavity injection retardation limit (FIG. 11A) to the intra-cavity injection advance limit (FIG. 9A) or when fuel is injected over a period from the intra-cavity injection retardation limit (FIG. 9B) to the extra-cavity injection advance limit (FIG. 11B), part of injected fuel is injected toward the intra-cavity region, and the other part is injected toward the extra-cavity region. That is, fuel is injected to the intra-cavity region and the extra-cavity region in a distributed manner. Such a situation is not limited to the case where fuel is injected through the main injection, and also applies to the case where fuel is injected through the pilot injection.

Figure 12:
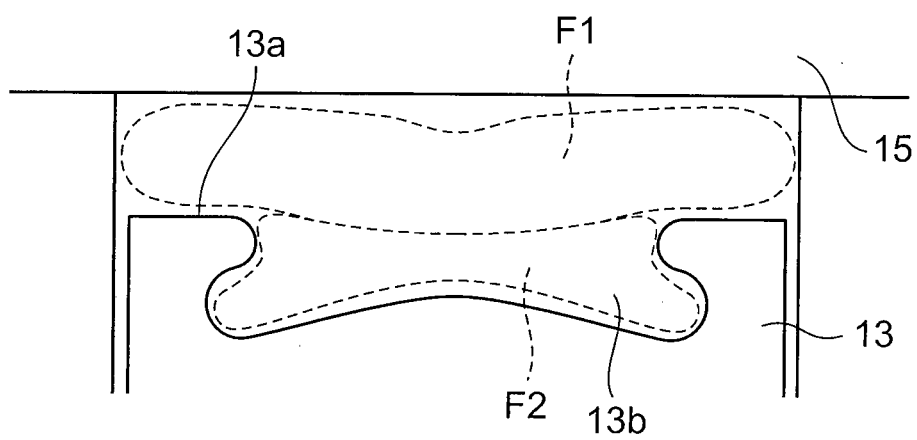
FIG. 12 is a view that shows a region in which spray is present in the case where the piston has moved to near the compression TDC in a state where part of injected fuel is injected toward the intra-cavity region and the other part is injected toward the extra-cavity region in the diesel engine.

FIG. 12 is a view that shows a region in which spray is present (spray injected toward the extra-cavity region is present in a region surrounded by the dashed line F1, and spray injected toward the intra-cavity region is present in a region surrounded by the dashed line F2) in the case where the piston 13 has moved to near the compression TDC in a state where part of injected fuel has been injected toward the intra-cavity region and the other part has been injected toward the extra-cavity region.

When fuel has been injected to the extra-cavity region and the intra-cavity region in a distributed manner in this way, in a situation that the amount of fuel present in each region falls within a range that does not exceed a predetermined amount, major parts of spray in each region and its combusted gas remain in the injected region, and there is almost no amount of gas flowing into the other regions (no amount of spray injected toward the extra-cavity region and its combusted gas, flowing into the intra-cavity region, and no amount of spray injected toward the intra-cavity region and its combusted gas, flowing into the extra-cavity region).

This is because, when spray injected toward the extra-cavity region combusts, gas in the intra-cavity region suppresses inflow of combusted gas from the extra-cavity region by the reaction of the inner wall of the cavity 13*b*. In the extra-cavity region, the fuel density is low, and the kinetic energy of combustion is also small, so inflow into the intra-cavity region is suppressed. Even when the kinetic energy of combustion in the extra-cavity region increases, because the volume of the intra-cavity region is small, so inflow into the intra-cavity region is suppressed by the reaction of gas that is compressed in the intra-cavity region.

At the time when spray injected toward the intra-cavity region combusts, the combustion occurs near the TDC, so the volume of the extra-cavity region is small (for example, see the state shown in FIG. 9A), and outflow of spray and combusted gas from the intra-cavity region to the extra-cavity region is suppressed by the reaction from the lower face of the cylinder head 15.

The injection period of fuel is determined on the basis of the fuel injection amount and the fuel pressure (the internal pressure of the common rail 22). That is, when the fuel pressure is constant, the injection period extends as the fuel injection amount increases (as the engine load increases as described above); whereas, when the fuel injection amount is constant, the injection period extends as the fuel pressure decreases. When the engine rotation speed is constant, it more easily leads to a situation in which fuel is injected to the extra-cavity region and the intra-cavity region in a distributed manner as the injection period of fuel extends.

Figure 13:
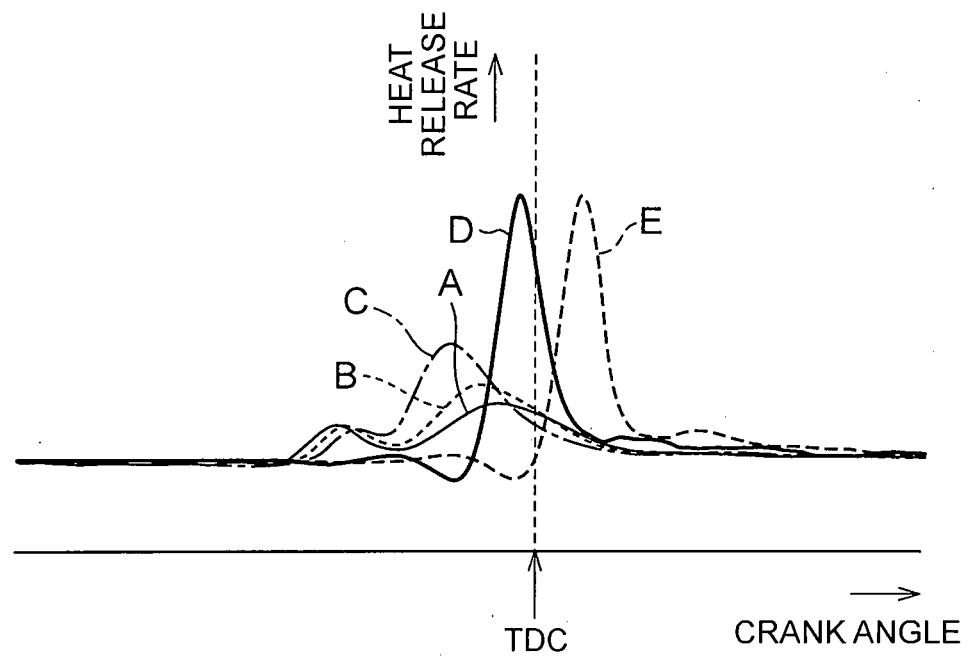
FIG. 13 is a waveform chart that shows an example of the correlation between a fuel injection rate (fuel injection amount per unit rotation angle of a crankshaft) waveform of the diesel engine and a heat release rate (heat release amount per unit rotation angle of the crankshaft) waveform.
Figure 13:
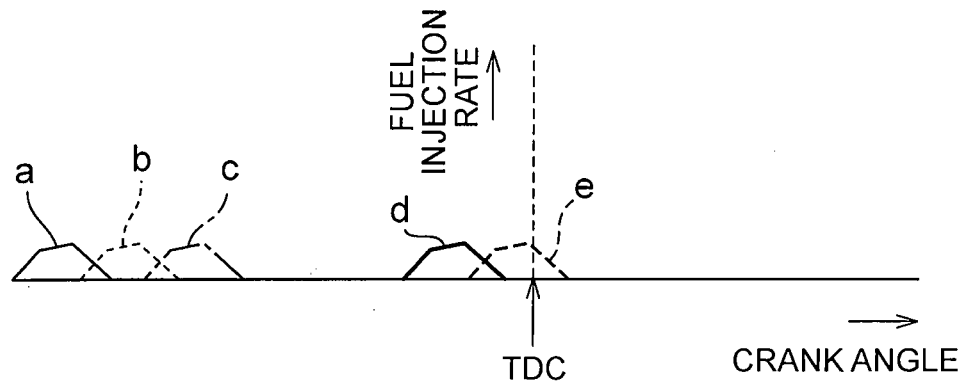

Next, the correlation between fuel injection timing and a heat release amount will be described. FIG. 13 shows an example of the correlation between a fuel injection rate waveform and a heat release rate waveform. In the graph, TDC denotes a crank angle position corresponding to the compression TDC of the piston 13. The waveforms shown at the bottom of FIG. 13 show multiple patterns of an injection rate (fuel injection amount per unit rotation angle of the crankshaft) waveform of fuel that is injected from the injector 23. The waveforms shown at the top of FIG. 13 show variations (heat release rate waveform) in heat release rate (heat release amount per unit rotation angle of the crankshaft) corresponding to fuel injection rates.

In the cases of the waveforms indicated by the continuous line a, the dashed line b and the alternate long and short dashed line c among the fuel injection rate waveforms shown in FIG. 13, fuel injection is started at timing advanced from the extra-cavity injection retardation limit (FIG. 11A) and fuel injection is terminated at timing advanced from the extra-cavity injection retardation limit, and substantially the entire amount of injected fuel is injected toward the extra-cavity region. The heat release rate waveform corresponding to the fuel injection rate waveform indicated by the continuous line a is indicated by the continuous line A. The heat release rate waveform corresponding to the fuel injection rate waveform indicated by the dashed line b is indicated by the dashed line B. The heat release rate waveform corresponding to the fuel injection rate waveform indicated by the alternate long and short dashed line c is indicated by the alternate long and short dashed line C.

In the cases of the waveforms indicated by the continuous line d and the dashed line e among the fuel injection rate waveforms shown in FIG. 13, fuel injection is started at timing retarded from the intra-cavity injection advance limit (FIG. 9A) and fuel injection is terminated at timing advanced from the intra-cavity injection retardation limit (FIG. 9B), and substantially the entire amount of injected fuel is injected toward the intra-cavity region. The heat release rate waveform corresponding to the fuel injection rate waveform indicated by the continuous line d is indicated by the continuous line D. The heat release rate waveform corresponding to the fuel injection rate waveform indicated by the dashed line e is indicated by the dashed line E.

As in the cases of the fuel injection rate waveforms shown in FIG. 13, when fuel injected to the extra-cavity region combusts although the injection amount in each fuel injection is equal, the heat release amount per unit rotation angle of the crankshaft is relatively small, and combustion is slow (see the heat release rate waveforms A, B, C shown in FIG. 13). This is because injected fuel is injected to the extra-cavity region having a relatively large volume and, therefore, a relatively low-density air-fuel mixture is produced in a temperature field of a relatively low temperature (for example, about 750K). Combustion of fuel in this case is mainly started from a low-temperature oxidation reaction.

In contrast, when fuel injected to the intra-cavity region combusts, the heat release amount per unit rotation angle of the crankshaft is relatively large, and combustion is steep (see the heat release rate waveforms D, E shown in FIG. 13). This is because injected fuel is injected to the intra-cavity region having a relatively small volume and, therefore, the temperature of a combustion field rapidly increases and a relatively high-density air-fuel mixture is produced in the temperature field. Combustion of fuel in this case is mainly started from a high-temperature oxidation reaction.

The sprays F of fuel injected through the injection holes of the injector 23 in this way mix with in-cylinder gas with a lapse of time to form air-fuel mixture, diffuse in substantially conical shape in the cylinder (diffuse in the intra-cavity region, the extra-cavity region, or both the intra-cavity region and the extra-cavity region), and combust through self-ignition. That is, the sprays F of fuel each form a combustion field together with in-cylinder gas, and combustion is started in each of the combustion fields.

As described above, the energy generated through the combustion is converted to kinetic energy for pushing the piston 13 downward toward the BDC (energy that becomes an engine output), thermal energy that increases the temperature in the corresponding combustion chamber 3 or thermal energy that is radiated to the outside (for example, coolant) via the cylinder block 11 or the cylinder head 15.

Combusted in-cylinder gas passes through the corresponding exhaust valve 17 that is opened in the exhaust stroke, and is emitted to the exhaust manifold 72 via the corresponding exhaust port 71 with upward movement of the corresponding piston 13 to become exhaust gas.

Figure 14:
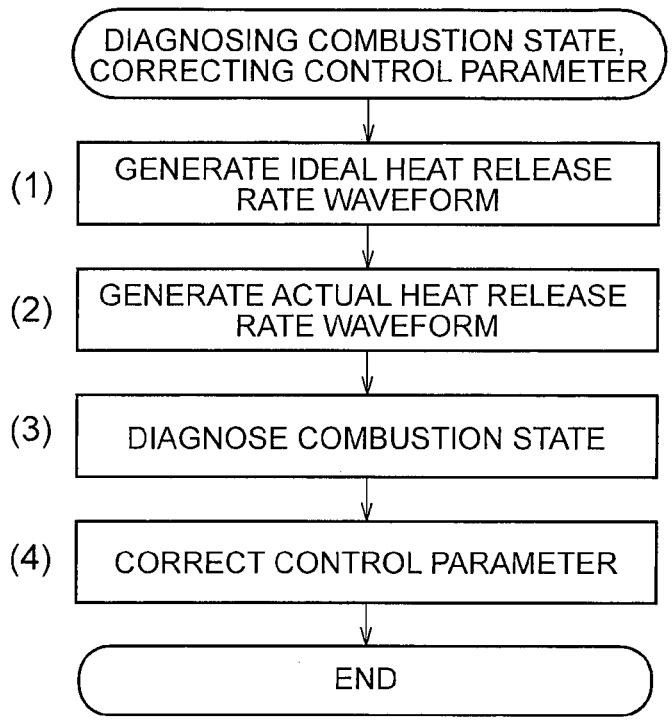
FIG. 14 is a flowchart that shows the procedure of diagnosing a combustion state of the diesel engine and correcting a control parameter of the diesel engine.

Next, the characteristic portions of the present embodiment, that is, generating a heat release rate waveform (generating an ideal heat release rate waveform), diagnosing a combustion state (diagnosing each reaction mode of fuel in the cylinder) and correcting a control parameter, which is executed in response to the diagnosed result, will be described. In generating a heat release rate waveform, diagnosing a combustion state and correcting a control parameter, as shown in FIG. 14, after (1) an ideal heat release rate waveform is generated and (2) an actual heat release rate waveform is generated, (3) a combustion state is diagnosed through a comparison between the ideal heat release rate waveform and the actual heat release rate waveform. After that, (4) the control parameter of the engine 1 is corrected in response to the result of the diagnosis of the combustion state. All the components for carrying out the operations of these (1) to (4) may be mounted on (implemented in) the vehicle. Alternatively, only the operation of (1) may be carried out in a laboratory, or the like, the result (generated ideal heat release rate waveform) may be stored in the ROM, and components for carrying out the operations of (2) to (4) may be mounted on the vehicle.

In the characteristic portions of the present embodiment, the inside of the cylinder is divided into the intra-cavity region and the extra-cavity region, and a combustion state in each region is individually determined. Therefore, in (1) generating an ideal heat release rate waveform, an ideal heat release rate waveform for the intra-cavity region and an ideal heat release rate waveform for the extra-cavity region are individually generated, and then an ideal heat release rate waveform (composite ideal heat release rate waveform) for all the inside of the cylinder is generated by combining these ideal heat release rate waveforms. In (3) diagnosing a combustion state, a combustion state is diagnosed through a comparison between the ideal heat release rate waveform and the actual heat release rate waveform for all the inside of the cylinder.

More specifically, in generating the ideal heat release rate waveform, (1-A) dividing a reaction region, (1-B) separating reaction modes of fuel, (1-C) generating an ideal heat release rate waveform model for each of the separated reaction modes, and (1-D) generating ideal heat release rate waveforms by filtering the ideal heat release rate waveform models and combining the ideal heat release rate waveforms are sequentially carried out.

Hereinafter, each operation will be specifically described. (1) Generating the ideal heat release rate waveform will be described. Initially, the outline of generating the ideal heat release rate waveform will be described. Hereinafter, between the intra-cavity region and the extra-cavity region, a region to which fuel is injected is termed "target region" (when fuel is injected to one of the regions, the one of the regions corresponds to the target region; whereas, when fuel is injected to both regions, both regions correspond to the target region).

A rate-determining condition of a reaction (chemical reaction, or the like) of fuel injected from the injector 23 to the target region may include an intra-target region temperature, an intra-target region oxygen amount (value that correlates with an oxygen density in the target region), an intra-target region fuel amount (value that correlates with a fuel density in the target region), and an intra-target region fuel distribution. Of these, the ascending order of control flexibility is the order of intra-target region temperature, intra-target region oxygen amount, intra-target region fuel amount and intra-target region fuel distribution.

That is, the intra-target region temperature is substantially determined by the intake air temperature and the compression ratio of the engine 1 in the stage before the reaction of fuel, so the control flexibility is the lowest. The intra-target region temperature also fluctuates with a preheated amount through combustion of fuel when fuel is injected ahead (for example, fuel is injected for preheating). The intra-target region oxygen amount is allowed to be adjusted by the opening degree of the intake throttle valve 62 or the opening degree of the EGR valve 81, so the control flexibility is higher than that of the intra-target region temperature. The intra-target region oxygen amount also fluctuates with the supercharging rate of the turbocharger 5. In addition, the intra-target region oxygen amount also fluctuates with an oxygen consumption amount through combustion of fuel when fuel is injected ahead (fuel is injected for preheating, or the like). The intra-target region fuel amount is allowed to be adjusted through control over the fuel injection pressure (common rail pressure) by the supply pump 21 or control over the injection period of each of multistage injections of fuel from the injector 23, so the control flexibility is higher than that of the intra-target region oxygen amount. The intra-target region fuel distribution is also allowed to be adjusted through control over the fuel injection pressure or control over the injection period of each of multistage injections of fuel, so the control flexibility is high.

In the present embodiment, on the condition that warm-up operation of the engine 1 is completed and an ambient temperature is higher than or equal to a predetermined temperature (for example, 0° C.), the order of precedence in the condition for determining the reaction state of fuel is set so as to be higher in ascending order of the control flexibility. Here, quantitative conditions, that is, the intra-target region temperature, the intra-target region oxygen amount and the intra-target region fuel amount, are given a higher priority than the intra-target region fuel distribution. That is, the timing of starting each reaction (reaction start timing) of fuel is determined with reference to the intra-target region temperature as a criterion. That is, a reference temperature reaching angle (crank angle position at the reaction start timing of each reaction mode) is fixed on the basis of the intra-target region temperature (compression gas temperature in the target region).

A reaction rate, a reaction amount and a reaction period are obtained on the basis of the reaction start timing, and then an ideal heat release rate waveform model for each reaction mode is generated for the target region. That is, the reaction rate, the reaction amount and the reaction period of each of the plurality of reaction modes of fuel injected into the target region are calculated on the basis of an intra-target region environment (an intra-target region gas temperature, and the like, that determine the reaction start timing) and a fuel composition (including a fuel amount and a fuel density that contribute to the reaction), and an ideal heat release rate waveform model in each of the reactions is generated. That is, when fuel is injected to one of the intra-cavity region and the extra-cavity region, the ideal heat release rate waveform model is generated for the one of the regions (target region); whereas, when fuel is injected to both regions, the ideal heat release rate waveform models are individually generated for both regions (both target regions).

As described above, the ideal heat release rate waveform model is generated only in the region in which spray is present between the intra-cavity region and the extra-cavity region. This is because, when no spray is present, the reaction of fuel is not generated and, therefore, an ideal heat release rate waveform model is not allowed to be generated. Determination as to whether spray is present in any one of the regions (or whether spray is present in both regions) is allowed to be made on the basis of the above-described fuel injection period.

In the operation of generating an ideal heat release rate waveform model, specifically, a reference reaction rate efficiency [J/CA$^2$/mm$^3$], corresponding to the intra-target region gas temperature (reference temperature), fuel composition, and the like, at the reaction start timing, and a reference reaction amount efficiency [J/mm$^3$] are set for each reaction mode, the reference reaction rate efficiency and the reference reaction amount efficiency are corrected on the basis of an oxygen supply capability to a combustion field (oxygen density), and a reaction rate and a reaction amount are set on the basis of these corrected efficiency and fuel amount. The reaction rate is corrected on the basis of the engine rotation speed (described later).

An ideal heat release rate waveform model (triangle model) (described later) are generated from the reaction start timing, the reaction rate and the reaction amount. Thus, a reaction period is set. The reaction period is obtained by the following mathematical expression (1).

$$\text{Reaction period} = 2 \times (\text{Reaction amount/Reaction rate})^{1/2} \quad (1)$$

The details of generating the ideal heat release rate waveform model (triangle model) will be described later.

(1-A) Next, dividing the reaction region, which is the first procedure of generating the ideal heat release rate waveform, will be specifically described. As described above, the region in which fuel injected from the injector 23 into the cylinder is present includes the extra-cavity region and the intra-cavity region.

When fuel is injected at timing advanced from the extra-cavity injection retardation limit (FIG. 11A) or when fuel is injected at timing retarded from the extra-cavity injection advance limit (FIG. 11B), substantially the entire amount of injected fuel is injected toward the extra-cavity region, substantially the entire amount of fuel is present in the extra-cavity region, and almost no spray is present in the intra-cavity region. Therefore, the amount of fuel injected from the injector 23 into the cylinder is directly the amount of fuel present in the extra-cavity region.

When fuel is injected only in the period between the intra-cavity injection advance limit (FIG. 9A) and the intra-cavity injection retardation limit (FIG. 9B), substantially the entire amount of injected fuel is injected toward the intra-cavity region, substantially the entire amount of fuel is present in the intra-cavity region, and almost no spray is present in the extra-cavity region. Therefore, the amount of fuel injected from the injector 23 into the cylinder is directly the amount of fuel present in the intra-cavity region.

In addition, when fuel is injected over the period from the extra-cavity injection retardation limit (FIG. 11A) to the intra-cavity injection advance limit (FIG. 9A) or when fuel is injected over the period from the intra-cavity injection retardation limit (FIG. 9B) to the extra-cavity injection advance limit (FIG. 11B), part of injected fuel is injected toward the extra-cavity region, and the other part is injected toward the intra-cavity region. Therefore, the part of the injected fuel is present in the extra-cavity region, and the other part is present in the intra-cavity region. In this case, the ratio of the amount of spray (the amount of fuel) present in the extra-cavity region and the amount of spray present in the intra-cavity region substantially coincides with the ratio of a period of time from fuel injection start timing to intermediate timing in a transition period that is the period between the intra-cavity injection advance limit (FIG. 9A) and the extra-cavity injection retardation limit (FIG. 11A) and a period of time from the intermediate timing to fuel injection termination timing. Therefore, when the ratio of the period of time from the fuel injection start timing to the intermediate timing in the transition period with respect to the fuel injection period is multiplied by the fuel injection amount, the amount of fuel (the amount of spray) present in the extra-cavity region is allowed to be calculated. When the ratio of the period of time from the intermediate timing in the transition period to the fuel injection termination timing with respect to the fuel injection period is multiplied by the fuel injection amount, the amount of spray present in the intra-cavity region is allowed to be calculated. When fuel is injected over the period from the intra-cavity injection retardation limit (FIG. 9B) to the extra-cavity injection advance limit (FIG. 11B) as well, the amount of spray present in each region is allowed to be calculated similarly.

In the thus configured present embodiment, the inside of the cylinder is divided (sectioned) into the extra-cavity region and the intra-cavity region, and the amount of fuel in each region is individually obtained.

The temperature of each of these extra-cavity region and intra-cavity region (the temperature of each region at the time of fuel injection) is also individually obtained. In a method of obtaining the temperatures, the intake air temperature, the piston position (the degree of compression of intake gas), a preheated state, or the like, of the target region due to the pilot injection, or the like, are used as parameters, the correlation between these parameters and the temperature of each of the extra-cavity region and the intra-cavity region is obtained and mapped through an experiment or simulation in advance, and the map is stored in the ROM.

That is, by applying the parameters, such as the intake air temperature, the piston position and the preheated state of each region to the map, the temperature of each of the extra-cavity region and the intra-cavity region is individually obtained. A method of obtaining these temperatures is not limited to this configuration. A value obtained by subtracting a predetermined temperature from an in-cylinder average temperature may be set as the temperature of the extra-cavity region, and a value obtained by adding a predetermined temperature to the in-cylinder average temperature may be set as the temperature of the intra-cavity region. For the predetermined temperature to be subtracted or added in this case, a map value based on the operating state of the engine 1 is obtained through an experiment or simulation, and is variable in accordance with the map value. The temperature may be calculated from the thermal energy equation Q=mcT (Q: thermal energy, m: mass, c: specific heat, T: temperature). Here, Q denotes the thermal energy input to the target region (the extra-cavity region or the intra-cavity region), m denotes the mass of gas in the target region, c denotes the specific heat of gas, and T denotes the temperature of the target region.

The amount of oxygen in the target region is allowed to be obtained by subtracting the amount of oxygen that contributes to combustion at the time of the pilot injection, or the like, from the amount of oxygen present in the target region. The amount of oxygen that contributes to combustion and the amount of oxygen present in the target region are obtained through an experiment or simulation in advance. The amount of oxygen present in the target region is allowed to be calculated by using the intake air temperature, the in-cylinder pressure, and the like, as parameters.

(1-B) Next, separating the reaction modes of fuel, which is a second procedure of generating the ideal heat release rate waveform, will be described. When fuel is injected from the injector 23, a vaporization reaction, a low-temperature oxidation reaction, a thermal decomposition reaction and a high-temperature oxidation reaction are carried out in the target region on the basis of the intra-target region environment. In addition, the high-temperature oxidation reaction may be separated into a high-temperature oxidation reaction through premixing combustion and a high-temperature oxidation reaction through diffuse combustion. That is, when fuel is injected to each of the extra-cavity region and the intra-cavity region, these reactions are carried out in each of these regions on the basis of the corresponding environment. Hereinafter, each reaction mode will be described.

(a) The vaporization reaction is that fuel injected from the injector 23 receives heat in the target region to vaporize. This reaction is generally the spray rate-determining reaction that starts at the time when diffusion of fuel spray proceeds to a certain degree in a state where fuel is exposed under an environment that the intra-target region gas temperature is higher than or equal to 500K.

The boiling point of light oil that is used in the diesel engine 1 is generally 453K to 623K, and a practical range in which fuel is injected into the target region (for example, the timing at which the pilot injection is carried out) is 40° CA BTDC (before the compression TDC). The intra-target region gas temperature at this timing generally increases to about 550K to 600K (other than cold places), so a temperature rate-determining condition does not need to be considered in the vaporization reaction. The reference reaction amount efficiency in this vaporization reaction is, for example, 1.14 [J/mm$^3$].

An effective injection amount in this vaporization reaction (the amount of fuel that contributes to the vaporization reaction) is an amount obtained by subtracting a wall face adhesion amount (the amount of fuel that adheres to the wall face of the cylinder bore 12 (when injected to the extra-cavity region) or the inner wall face of the cavity 13b (when injected to the intra-cavity region)) and the amount of suspended unburned fuel (which is present around spray mass and does not contribute to the reaction) from the fuel injection amount. Hereinafter, these amounts of fuel are referred to as the amount of unburned fuel. These amounts of unburned fuel are allowed to be empirically obtained on the basis of the injection amount (which correlates with the penetration force of fuel) and the injection timing (which correlates with the in-cylinder pressure).

Specifically, spray diffuses more easily when fuel is injected to the extra-cavity region than when fuel is injected to the intra-cavity region, so the ratio of the amount of unburned fuel to the total amount of injected fuel increases. For example, the ratio of the amount of unburned fuel when fuel is injected to the intra-cavity region is about 15%; whereas the ratio of the amount of unburned fuel when fuel is injected to the extra-cavity region is about 20%. These ratios are not limited to these values. These values fluctuate with the temperature and pressure of each region, the fuel injection pressure, and the like, so these values are obtained through an experiment or simulation in advance.

The reaction amount in the vaporization reaction is obtained by the following mathematical expression (2).

$$\text{Reaction amount in vaporization reaction} = -1.14 \times \text{Effective injection amount} \quad (2)$$

Because this vaporization reaction is an endothermic reaction, the reaction amount (generated heat amount) is a positive value.

(b) The low-temperature oxidation reaction is a reaction in which a low-temperature oxidation reaction component (such as fuel having a linear single bond composition, such as n-cetane ($C_{16}H_{34}$)) contained in light oil that is the fuel of the diesel engine 1 combusts. The low-temperature oxidation reaction component is a component that is ignitable even when the intra-target region temperature is relatively low. As the amount of n-cetane, or the like, increases (as the cetane number of fuel increases), the low-temperature oxidation reaction in the target region easily proceeds, and a delay of ignition is suppressed. Specifically, the low-temperature oxidation reaction component, such as n-cetane, starts combusting (low-temperature oxidation reaction) at the timing at which the intra-target region temperature has reached about 750K. A fuel component (high-temperature oxidation reaction component) other than n-cetane, or the like, does not start combusting (high-temperature oxidation reaction) until the intra-target region temperature reaches about 900K.

The reference reaction rate efficiency in the low-temperature oxidation reaction is, for example, 0.294 [J/CA$^2$/mm$^3$]. The reference reaction amount efficiency is, for example, 5.0 [J/mm$^3$].

The reaction rate and reaction amount of the low-temperature oxidation reaction are calculated on the basis of the reference reaction rate efficiency and the reference reaction amount efficiency (for example, calculated by multiplying the effective injection amount). In addition, in calculating the reaction rate of the low-temperature oxidation reaction, a value (reference reaction rate) obtained by multiplying the reference reaction rate efficiency by the effective injection amount is multiplied by a coefficient (Rotation speed correction coefficient=(Reference rotation speed/Actual rotation speed)$^2$) based on the engine rotation speed. A selected rotation speed (for example, 2000 rpm) may be set as a reference rotation speed for obtaining the rotation speed correction coefficient. Thus, even when a gas composition, or the like, changes, the reaction rate is allowed to be obtained as a value that depends on a period of time.

Figure 15:
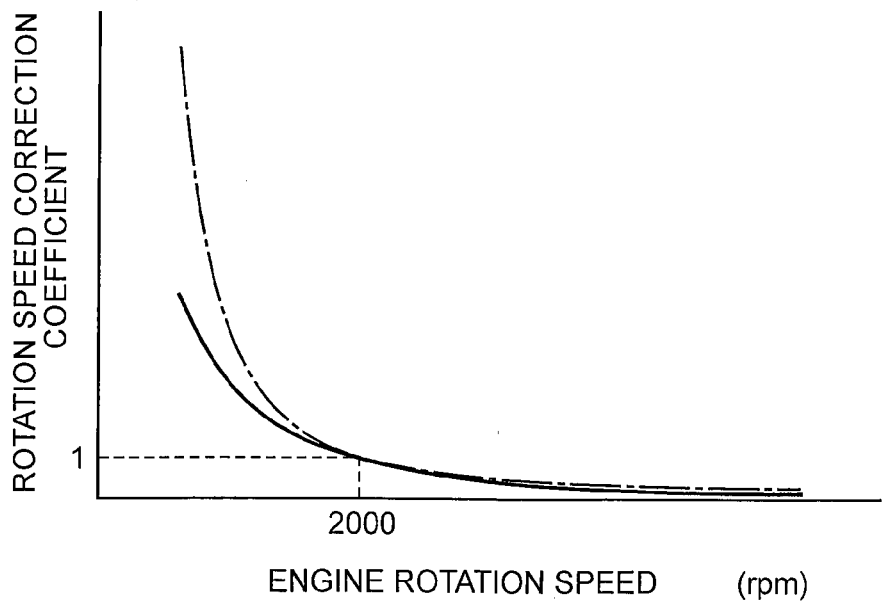
FIG. 15 is a graph that shows a rotation speed correction coefficient map of the diesel engine.

The rotation speed correction coefficient may be obtained from a rotation speed correction coefficient map shown in FIG. 15. The rotation speed correction coefficient map shown in FIG. 15 is a map in which the reference rotation speed is set to 2000 rpm. In a region in which the actual rotation speed of the engine 1 is higher than or equal to the reference rotation speed (2000 rpm), the rotation speed correction coefficient is obtained as a value based on the "(Reference rotation speed/Actual rotation speed)$^2$" (value based on the engine rotation speed indicated by the alternate long and short dashed line in the graph). In contrast, in a region in which the actual rotation speed of the engine 1 is lower than the reference rotation speed (2000 rpm), a value corrected (corrected to a lower side) by a predetermined percentage from a value based on "(Reference rotation speed/Actual rotation speed)$^2$" is obtained as the rotation speed correction coefficient (see the continuous line in the region lower than the reference rotation speed). The correction percentage in this case is obtained through an experiment or simulation.

The reference rotation speed is not limited to the above-described value, and is desirably set to a rotation speed range in which the usage frequency of the engine 1 is the highest. Because the low-temperature oxidation reaction is an exothermic reaction, the reaction amount (generated heat amount) is a positive value.

(c) The thermal decomposition reaction is a reaction in which a fuel component is thermally decomposed, and the reaction temperature is, for example, about 800K. The reference reaction rate efficiency in the thermal decomposition reaction is, for example, 0.384 [J/CA$^2$/mm$^3$]. The reference reaction amount efficiency is, for example, 5.0 [J/mm$^3$].

The reaction rate and reaction amount of the thermal decomposition reaction are also calculated on the basis of the reference reaction rate efficiency and the reference reaction amount efficiency (for example, calculated by multiplying the effective injection amount). In addition, in calculating the reaction rate of the thermal decomposition reaction as well, a value (reference reaction rate) obtained by multiplying the reference reaction rate efficiency by the effective injection amount is multiplied by the rotation speed correction coefficient based on the engine rotation speed.

In the present embodiment, the thermal decomposition reaction is treated as an endothermic reaction. That is, the reaction amount (generated heat amount) is a negative value.

(d) The reaction temperature of the high-temperature oxidation reaction through premixing combustion is, for example, about 900K. That is, the reaction that starts combustion as the intra-target region temperature has reached 900K is the high-temperature oxidation reaction through the premixing combustion.

The reference reaction rate efficiency in the high-temperature oxidation reaction through the premixing combustion is, for example, 4.3 [J/CA$^2$/mm$^3$]. The reference reaction amount efficiency is, for example, 30.0 [J/mm$^3$].

The reaction rate and reaction amount of the high-temperature oxidation reaction through the premixing combustion are also calculated on the basis of the reference reaction rate efficiency and the reference reaction amount efficiency (for example, calculated by multiplying the effective injection amount). In addition, in calculating the reaction rate of the high-temperature oxidation reaction through the premixing combustion as well, a value (reference reaction rate) obtained by multiplying the reference reaction rate efficiency by the effective injection amount is multiplied by the rotation speed correction coefficient based on the engine rotation speed. Because the high-temperature oxidation reaction through the premixing combustion is an exothermic reaction, the reaction amount (generated heat amount) is a positive value.

(e) The reaction temperature of the high-temperature oxidation reaction through diffuse combustion is, for example, about 1000K. That is, the high-temperature oxidation reaction through the diffuse combustion is the reaction that fuel injected toward the intra-target region in which the temperature is higher than or equal to 1000K starts combustion immediately after injection.

The reaction rate in the high-temperature oxidation reaction through the diffuse combustion varies with the common rail pressure and the fuel injection amount, and is obtained from the following mathematical expression (3) and mathematical expression (4).

$$GrdB = A \times \text{Common rail pressure} + B \qquad (3)$$

$$Grd = GrdB \times (\text{Reference engine rotation speed/Actual engine rotation speed})^2 \times (d/\text{Reference } d) \times (N/\text{Reference } N) \qquad (4)$$

GrdB: reference reaction rate, Grd: reaction rate, d: the injection hole diameter of each injector 23, N: the number of injection holes of each injector 23, A, B: constants obtained through an experiment, or the like The mathematical expression (4) is generalized by being multiplied by the ratio of the actual injection hole diameter to the reference injection hole diameter of each injector 23 and the ratio of the number of actual injection holes to the number of reference injection holes of each injector 23. The mathematical expression (4) is that the reaction rate corrected on the basis of the engine rotation speed is obtained by being multiplied by the rotation speed correction coefficient.

The reference reaction amount efficiency of the high-temperature oxidation reaction through the diffuse combustion is, for example, 30.0 [J/mm$^3$], and the reaction amount of the high-temperature oxidation reaction through the diffuse combustion is also calculated on the basis of the reference reaction amount efficiency (for example, calculated by multiplying the effective injection amount). Because the high-temperature oxidation reaction through the diffuse combustion is also an exothermic reaction, the reaction amount (generated heat amount) is a positive value. Thus, the reaction modes of fuel are allowed to be separated.

(1-C) Next, generating an ideal heat release rate waveform model for each of the separated reaction modes for each of the intra-cavity region and the extra-cavity region will be described.

By separating the reaction modes as described above, the ideal heat release rate waveform model in each of the reaction modes is allowed to be generated. That is, the ideal heat release rate waveform model is allowed to be generated for each of the vaporization reaction, the low-temperature oxidation reaction, the thermal decomposition reaction, the high-temperature oxidation reaction through premixing combustion and the high-temperature oxidation reaction through diffuse combustion.

In the present embodiment, the ideal heat release rate waveform model is approximated to an isosceles triangle for each of the reactions. That is, the ideal heat release rate waveform model is generated such that the reaction rate is set as the gradient of each oblique line of the isosceles triangle, the reaction amount is set as the area of the isosceles triangle and the reaction period is set as the length of the base of the isosceles triangle where the above-described reaction start temperature is set for a base point. As described above, the reaction start temperatures are respectively about 500K in the vaporization reaction, about 750K in the low-temperature oxidation reaction, about 800K in the thermal decomposition reaction, about 900K in the high-temperature oxidation reaction through premixing combustion, and about 1000K in the high-temperature oxidation reaction through diffuse combustion. Generating the following ideal heat release rate waveform model is applied to each of the above-described reaction modes. Hereinafter, description will be specifically made.

(a) Reaction Rate (Gradient)

The reaction rate is set on the basis of the reference reaction rate efficiency, and, when the ideal heat release rate waveform model is approximated to an isosceles triangle, the absolute value of an upward gradient in a period during which the heat release rate increases coincides with the absolute value of a downward gradient in a period during which the heat release rate decreases.

When the reaction rate in the period during which the heat release rate decreases is lower than the reaction rate in the period during which the heat release rate increases (when the ideal heat release rate waveform model is a scalene triangle), the downward gradient is obtained by multiplying the upward gradient by a predetermined value $\alpha$ (<1).

In the ideal heat release rate waveform model in the high-temperature oxidation reaction through the diffuse combustion, the reaction rate is directly proportional to an injection rate waveform gradient, and the reaction rate is constant when the fuel injection pressure (common rail internal pressure) is constant. In the ideal heat release rate waveform model in the other reaction (for example, the high-temperature oxidation reaction through premixing combustion), the reaction rate is directly proportional to the fuel injection amount.

(b) Generated Heat Amount (Area)

A thermal efficiency [$J/mm^3$] in each reaction may be regarded as a constant (for example, 30 $J/mm^3$ in the case of the high-temperature oxidation reaction) when the combustion period is optimized. Therefore, the generated heat amount is obtained by multiplying the thermal efficiency by the fuel injection amount (the effective injection amount). However, the low-temperature oxidation reaction together with the high-temperature oxidation reaction goes to completion, and the high-temperature oxidation reaction through diffuse combustion goes to completion solely. The thus obtained generated heat amount corresponds to the area of the triangle that is the ideal heat release rate waveform model.

(c) Combustion Period (Base)

The combustion period corresponding to the length of the base of the triangle is obtained from the above-described gradient (reaction rate) of the triangle and the above-described area (generated heat amount) of the triangle.

Figure 16A:
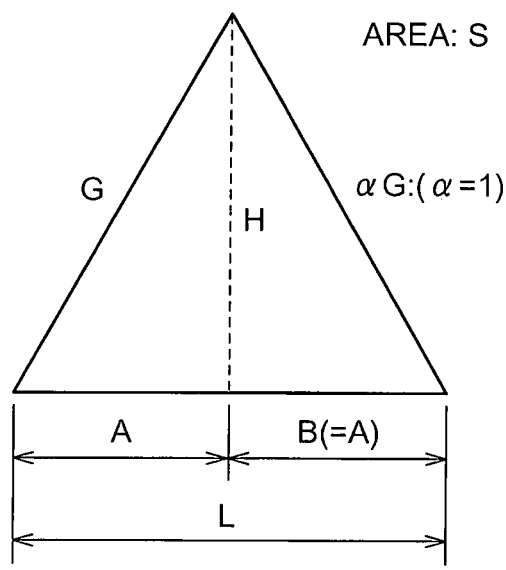
FIG. 16A is a view that shows an ideal heat release rate waveform model in the diesel engine and shows the case where the ideal heat release rate waveform model is an isosceles triangle.
Figure 16B:
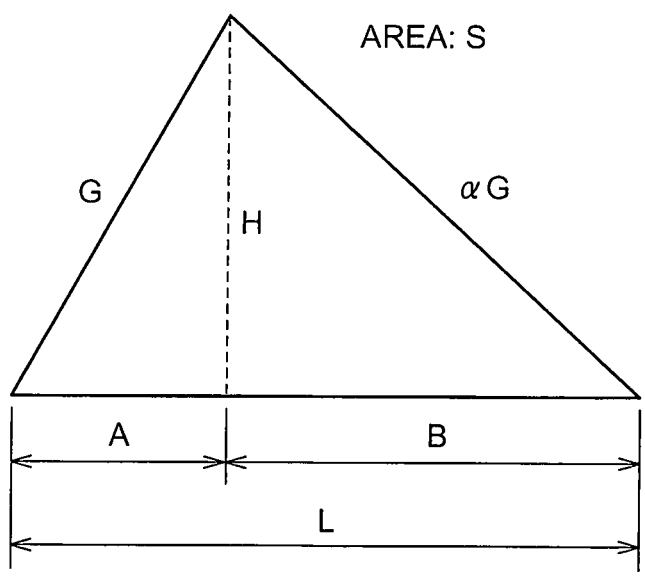
FIG. 16B is a view that shows an ideal heat release rate waveform model in the diesel engine and shows the case where the ideal heat release rate waveform model is a scalene triangle.

As shown in FIG. 16A and FIG. 16B, where the area of the triangle (which corresponds to the generated heat amount) is S, the length of the base (which corresponds to the combustion period) is L, the height (which corresponds to the heat release rate at the heat release rate peak timing) is H, the period from the combustion start timing to the heat release rate peak timing is A, the period from the heat release rate peak timing to the combustion termination timing is B (when the ideal heat release rate waveform model is an isosceles triangle, B=A), the upward gradient (which corresponds to the reaction rate in the period during which the heat release rate increases) is G, and the ratio of the downward gradient (which corresponds to the reaction rate in the period during which the heat release rate decreases) to the upward gradient is a 1), the following relationship holds. FIG. 16A shows the case where the ideal heat release rate waveform model is an isosceles triangle. FIG. 16B shows the case where the ideal heat release rate waveform model is a scalene triangle.

$$H = A \times G = B \times \alpha \times G$$

Thus, $B = A/\alpha$.

$$S = A^2 \times G/2 + A \times G \times B/2 = (1+1/\alpha) \times A^2 \times G/2$$

Thus, $A = SQRT[2S/\{(1+1/\alpha)G\}]$.

Thus, the length L of the base is $L = A+B = A(1+1/\alpha) = (1+1/\alpha) \times SQRT[2S/\{(1+1/\alpha)G\}]$.

When the ideal heat release rate waveform model is an isosceles triangle, $\alpha=1$, $L = 2 \times SQRT(S/G) = 2 \times SQRT(30 \times Fq/G)$.

(Fq is the fuel injection amount (effective injection amount), and, when the generated heat amount per 1 $mm^3$ fuel is 30J as described above, "30×Fq" is the area S of the triangle.) In this way, when the injection amount (injection amount command value: a value that correlates with the generated heat amount) and the gradient (reaction rate) are given, the combustion period is set.

Figure 17:
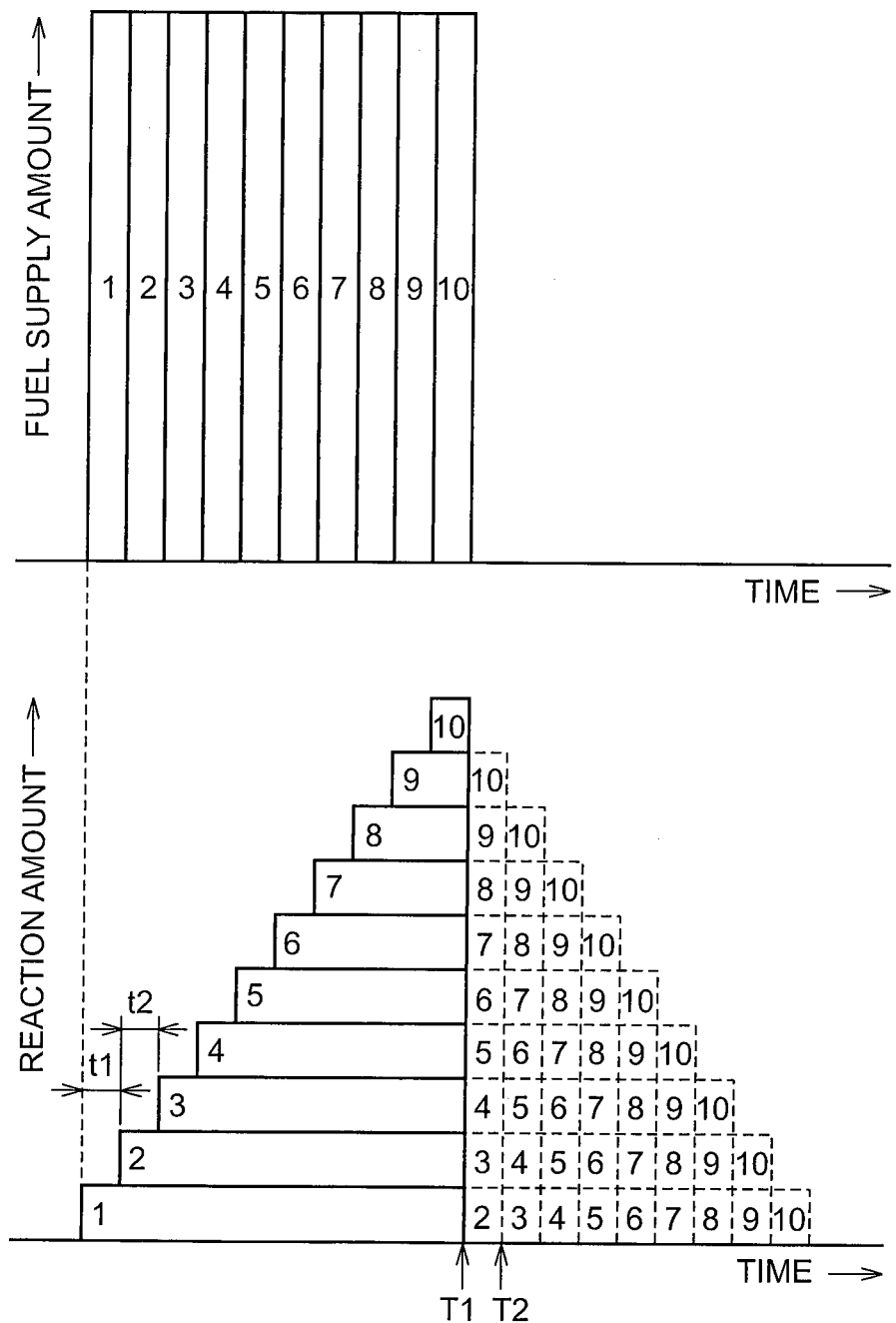
FIG. 17 shows graphs in which (a) at the top of FIG. 17 shows the correlation between an elapsed time and a fuel supply amount to the inside of the cylinder in the case where fuel is injected from an injector and (b) at the bottom of FIG. 17 shows a reaction amount of fuel injected in each period.

Hereinafter, the reason why the ideal heat release rate waveform model is approximated to a triangle (particularly, an isosceles triangle) will be described. The top (a) in FIG. 17 shows the correlation between an elapsed time in the case where fuel is injected from the injector 23 and a fuel supply amount to the corresponding cylinder in one reaction mode (the amount of fuel that is used in the reaction mode). In the top (a) in FIG. 17, the fuel injection period during which the fuel supply amount is obtained is separated into 10 periods. That is, the fuel injection period is separated into 10 periods in which the fuel supply amount is equal to one another, and period numbers, that is, the first period to the tenth period, are respectively assigned. That is, after fuel injection in the first period terminates, fuel injection in the second period is started without an interruption of fuel injection. After fuel injection in the second period terminates, fuel injection in the third period is started without an interruption of fuel injection. In such an injection mode, fuel injection is continued until the termination timing of the tenth period.

The bottom (b) in FIG. 17 shows the reaction amount (the one shown at the bottom (b) in FIG. 17 is the generated heat amount in the exothermic reaction) of fuel injected in each period. As shown in the bottom (b) of FIG. 17, fuel injection is started in the first period, only the reaction of fuel injected in the first period occurs in a period until fuel injection in the second period is started (period t1 in the bottom (b) of FIG. 17). Fuel injection in the second period is started, and the reaction of fuel injected in the first period and the reaction of fuel injected in the second period occur at the same time in a period (period t2 in the bottom (b) of FIG. 17) until fuel injection in the third period is started. In this way, each time a new injection period comes, the total reaction amount of fuel gradually increases (the total reaction amount increases by the amount of fuel in a period during which injection is newly started). The increasing period corresponds to a period having a positive gradient of the ideal heat release rate waveform model (period advanced from the peak position of the reaction).

After that, the reaction of fuel injected in the first period terminates. At this timing (timing T1 in the bottom (b) of FIG. 17), the reaction of fuel injected after the second period has not terminated yet, and the reaction of fuel injected in the second period to the tenth period is continuing. When the reaction of fuel injected in the second period terminates (timing T2 in the bottom (b) of FIG. 17), the reaction of fuel injected after the third period has not terminated yet, so the reaction of fuel injected in the third period to the tenth period continues. In this way, the reaction of fuel injected in each period sequentially terminates, so the total reaction amount of fuel gradually reduces (the total reaction amount reduces by the amount of fuel for which the reaction has terminated). The reducing period (period in which the reaction amount is indicated by the dashed line in the bottom (b) of FIG. 17) corresponds to a negative gradient period (period retarded from the peak position of the reaction) of the ideal heat release rate waveform model.

Because the reaction of fuel occurs in the above-described mode, the ideal heat release rate waveform model is allowed to be approximated to a triangle (isosceles triangle). The procedure of generating the ideal heat release rate waveform model for each reaction mode of fuel is as described above.

(1-D) After the ideal heat release rate waveform models are generated in this way, the ideal heat release rate waveforms are generated by smoothing the ideal heat release rate waveform models through known filtering (for example, by Wiebe filter). Hereinafter, description will be made specifically.

Figure 18:
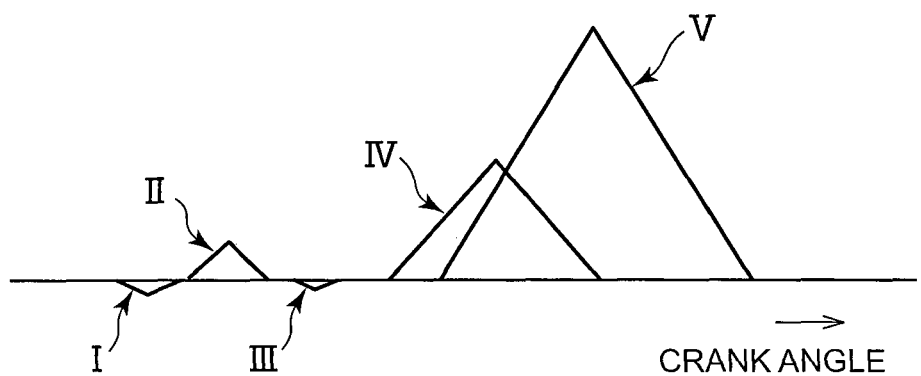
FIG. 18 is a view that shows an example of an ideal heat release rate waveform model in each reaction mode in the case where fuel is injected into the extra-cavity region once in the diesel engine.

FIG. 18 shows an example of the ideal heat release rate waveform model in each reaction mode (the isosceles triangle corresponding to each reaction) in the case where fuel is injected once to the extra-cavity region. In FIG. 18, the ideal heat release rate waveform models (the isosceles triangles corresponding to the reactions) in which the vaporization reaction, the low-temperature oxidation reaction, the thermal decomposition reaction, and the high-temperature oxidation reactions are sequentially carried out through fuel injection once. Specifically, in the drawing, I denotes the ideal heat release rate waveform model of the vaporization reaction, II denotes the ideal heat release rate waveform model of the low-temperature oxidation reaction, III denotes the ideal heat release rate waveform model of the thermal decomposition reaction (endothermic thermal decomposition reaction), IV denotes the ideal heat release rate waveform model of the high-temperature oxidation reaction through premixing combustion, and V denotes the ideal heat release rate waveform model of the high-temperature oxidation reaction through diffuse combustion.

Figure 19:
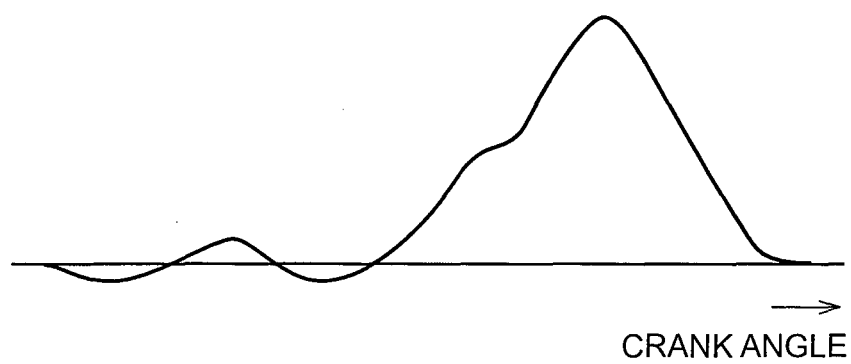
FIG. 19 is a view that shows an ideal heat release rate waveform generated by combining waveforms obtained by smoothing the ideal heat release rate waveform models shown in FIG. 18 through filtering.

FIG. 19 shows the ideal heat release rate waveform (extra-cavity injection ideal heat release rate waveform) generated by combining the waveforms obtained by smoothing the ideal heat release rate waveform models through filtering in the case where fuel has been injected once to the extra-cavity region. In this way, the ideal heat release rate waveform for only the extra-cavity region is generated by smoothing the ideal heat release rate waveform models (isosceles triangles) corresponding respectively to the reactions (the vaporization reaction, the low-temperature oxidation reaction, the thermal decomposition reaction and the high-temperature oxidation reactions) through filtering and combining the ideal heat release rate waveforms.

Figure 20:
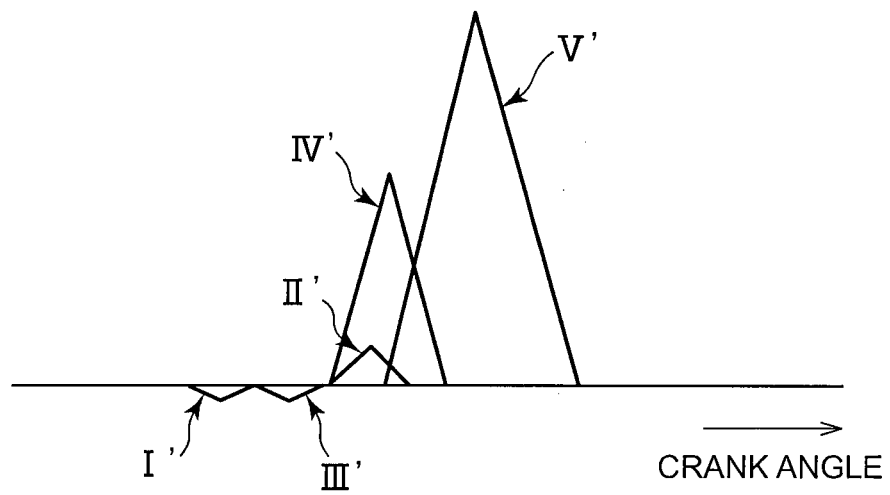
FIG. 20 is a view that shows an example of an ideal heat release rate waveform model in each reaction mode in the case where fuel is injected into the intra-cavity region once in the diesel engine.

On the other hand, FIG. 20 shows an example of the ideal heat release rate waveform models (the isosceles triangles corresponding to the reactions) in the respective reaction modes in the case where fuel has been injected once to the intra-cavity region. In FIG. 20, due to a steep increase in the temperature of the intra-cavity region, the ideal heat release rate waveform models (the isosceles triangles corresponding to the reactions) are such that, after the vaporization reaction and the thermal decomposition reaction are sequentially carried out through single fuel injection, the low-temperature oxidation reaction and the high-temperature oxidation reaction through premixing combustion are carried out in parallel with each other and then the high-temperature oxidation reaction through diffuse combustion is carried out after the start of these low-temperature oxidation reaction and high-temperature oxidation reaction through premixing combustion. Specifically, in the drawing, I' denotes the ideal heat release rate waveform model of the vaporization reaction, II' denotes the ideal heat release rate waveform model of the low-temperature oxidation reaction, III' denotes the ideal heat release rate waveform model of the thermal decomposition reaction (endothermic thermal decomposition reaction), IV' denotes the ideal heat release rate waveform model of the high-temperature oxidation reaction through premixing combustion, and V' denotes the ideal heat release rate waveform model of the high-temperature oxidation reaction through diffuse combustion.

Figure 21:
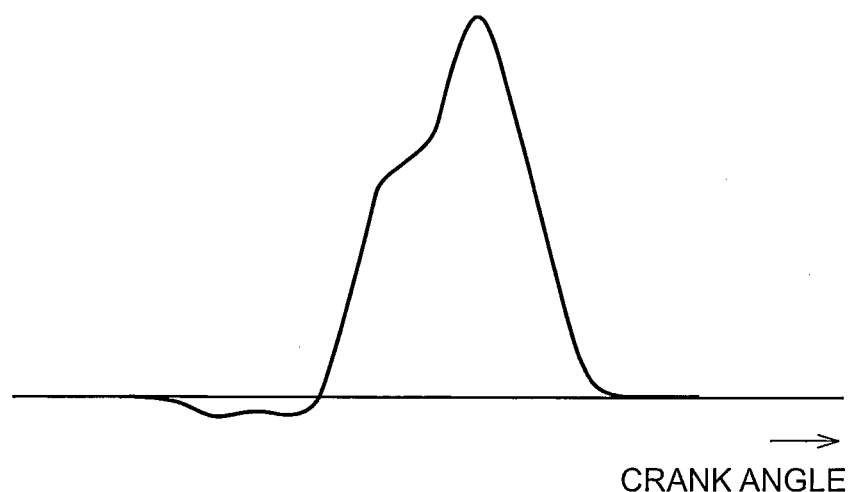
FIG. 21 is a view that shows an ideal heat release rate waveform generated by combining waveforms obtained by smoothing the ideal heat release rate waveform models shown in FIG. 20 through filtering.

FIG. 21 shows the ideal heat release rate waveform (intra-cavity injection ideal heat release rate waveform) generated by combining the waveforms obtained by smoothing the ideal heat release rate waveform models through filtering in the case where fuel has been injected once to the intra-cavity region. In this way, the ideal heat release rate waveform for only the intra-cavity region is generated by smoothing the ideal heat release rate waveform models (isosceles triangles) corresponding respectively to the reactions (the vaporization reaction, the low-temperature oxidation reaction, the thermal decomposition reaction and the high-temperature oxidation reactions) through filtering and combining the ideal heat release rate waveforms.

As described above, in single fuel injection, when substantially the entire amount of the fuel has been injected to the extra-cavity region, for example, the ideal heat release rate waveform as shown in FIG. 19 is generated. On the other hand, in single fuel injection, when substantially the entire amount of the fuel has been injected to the intra-cavity region, for example, the ideal heat release rate waveform as shown in FIG. 21 is generated.

Figure 22:
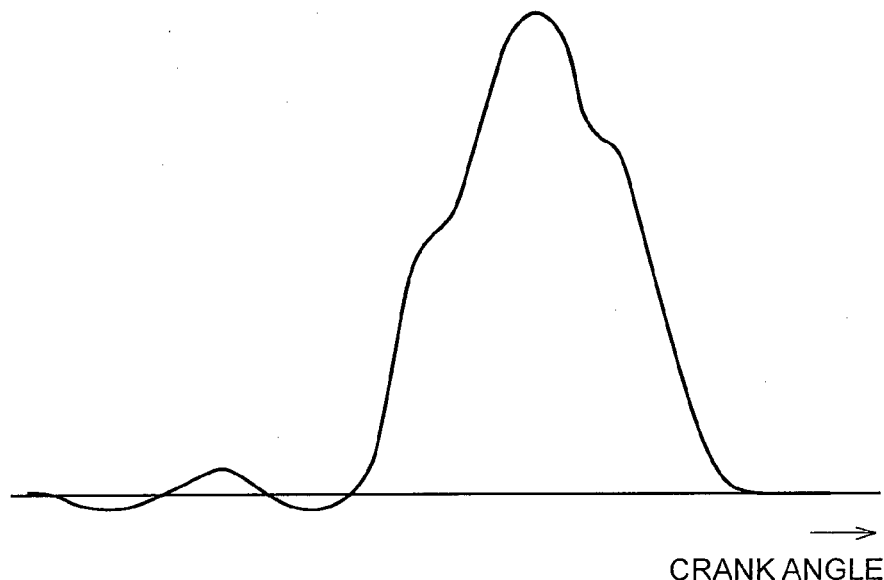
FIG. 22 is a view that shows an ideal heat release rate waveform for all the inside of the cylinder, generated by combining the ideal heat release rate waveform for the extra-cavity region with the ideal heat release rate waveform for the intra-cavity region in the diesel engine.

In addition, in single fuel injection, when part of fuel has been injected to the extra-cavity region and the other part has been injected to the intra-cavity region, that is, when fuel has been injected to the extra-cavity region and the intra-cavity region in a distributed manner, the ideal heat release rate waveform for the extra-cavity region and the ideal heat release rate waveform for the intra-cavity region are generated, and combined with each other. Thus, the ideal heat release rate waveform for all the inside of the cylinder is generated. For example, when the ideal heat release rate waveform in the case where fuel has been injected once to the extra-cavity region is the one shown in FIG. 19 and the ideal heat release rate waveform in the case where fuel has been injected once to the intra-cavity region is the one shown in FIG. 21, the ideal heat release rate waveform (in-cylinder ideal heat release rate waveform) as shown in FIG. 22 is generated as the ideal heat release rate waveform for all the inside of the cylinder.

In the actual engine 1, pilot injection, after-injection, or the like, is carried out other than main injection. Therefore, for these pilot injection and after-injection as well, as in the case of the above description, an ideal heat release rate waveform model in a target region is generated, and is, smoothed through filtering. Thus, the ideal heat release rate waveform is generated. Generally, the pilot injection is carried out at a crank angle position advanced by a predetermined angle or larger from the compression TDC of the piston 13, and the after-injection is carried out at a crank angle position retarded by a predetermined angle or larger from the compression TDC of the piston 13, so these injections are carried out toward the extra-cavity region. Therefore, the ideal heat release rate waveform for these injections is obtained as the extra-cavity injection ideal heat release rate waveform.

The ideal heat release rate waveform for one cycle is generated by combining the ideal heat release rate waveform for all the inside of the cylinder in the main injection with these ideal heat release rate waveforms (the ideal heat release rate waveforms for the pilot injection and the after-injection).

Even when the main injection is carried out multiple split times (split main injections), the ideal heat release rate waveform for one cycle is generated by combining the ideal heat release rate waveforms of the respective main injections with each other.

When multiple injections are carried out in this way, it is required to consider that the intra-target region temperature at the timing at which fuel is injected in the initial stage (advance side) is different from the intra-target region temperature at the timing at which fuel is injected thereafter (retardation side) at the time of combining the ideal heat release rate waveforms with each other. Specifically, in an engine steady operating state, when the preheating, or the like, is not carried out at the timing at which fuel is injected at the advance side, the reaction is started on the basis of the compression gas temperature resulting from an increase in the temperature of gas, such as fresh air that is introduced from the outside, remaining gas in the cylinder and EGR gas, with movement of the piston 13. At the start of the engine, the recovery of fuel injection from fuel cut, or the like, the reaction is started on the basis of the compression gas temperature due to an increase in the temperature of fresh air that is introduced from the outside with movement of the piston 13. On the other hand, when fuel is injected at the retardation side, fuel is injected to a temperature field of which the temperature is increased by adding the temperature of burned gas, or, the like (combusted gas of fuel injected at the advance side) to the compression gas temperature, so the reaction start timing shifts toward the advance side as compared to the case where there is no increase in temperature due to burned gas. By taking this point into consideration, the ideal heat release rate waveform through the reaction of fuel injected at the advance, side and the ideal heat release rate waveform through the reaction of fuel injected at the retardation side are obtained in consideration of the above-described temperature change. That is, the start timing, and the like, of each reaction in each injection are determined by temperature control. Thus, it is allowed to appropriately obtain the start timing of each reaction in each injection. As a result, it is possible to properly determine the order of the start of reaction, a period during which reactions are carried out in parallel with each other, and the like, and it is possible to highly accurately generate the ideal heat release rate waveform by combining the ideal heat release rate waveforms generated in correspondence with the injections.

(2) The actual heat release rate waveform that is compared with the ideal heat release rate waveform is generated on the basis of a variation in the in-cylinder pressure that is detected by the CPS 4A. That is, because there is a correlation between the heat release rate and the in-cylinder pressure in the cylinder (the in-cylinder pressure increases as the heat release rate increases), the actual heat release rate waveform is allowed to be generated from the in-cylinder pressure that is detected by the CPS 4A. The process of generating the actual heat release rate waveform from the detected in-cylinder pressure is known, so the description is omitted here.

(3) Diagnosing the combustion state (diagnosing the reaction mode) through a comparison between the ideal heat release rate waveform and the actual heat release rate waveform is carried out on the basis of a deviation of the actual heat release rate waveform from the ideal heat release rate waveform. For, example, when there is a reaction mode in which the deviation is larger than or equal to a preset threshold (an abnormality determination deviation amount in the invention), it is diagnosed that there is an abnormality in that reaction mode. For example, when there is a reaction mode in which the deviation of the heat release rate is larger than or equal to $10[J/°CA]$ or when there is a reaction mode in which the deviation in crank angle (advance-side deviation or retardation-side deviation) of the actual heat release rate waveform from the ideal heat release rate waveform is larger than or equal to $3°CA$, it is diagnosed that there is an abnormality in that reaction mode. These deviations are not limited to these values, and may be set as needed through an experiment or simulation.

For example, the case where the ideal heat release rate waveform shown in FIG. 22 is generated will be described as an example. As in the case of the actual heat release rate waveform indicated by the dashed line in FIG. 23, when the actual heat release rate waveform in each high-temperature oxidation reaction (the high-temperature oxidation reaction through premixing combustion and the high-temperature oxidation reaction through diffuse combustion) deviates toward the retardation side from the ideal heat release rate waveform (waveform shown in FIG. 22) indicated by the continuous line, and the deviation exceeds the threshold, it is diagnosed that there is an abnormality in each high-temperature oxidation reaction, that is, there is an abnormality in the reaction start timing of each high-temperature oxidation reaction.

Figure 23:
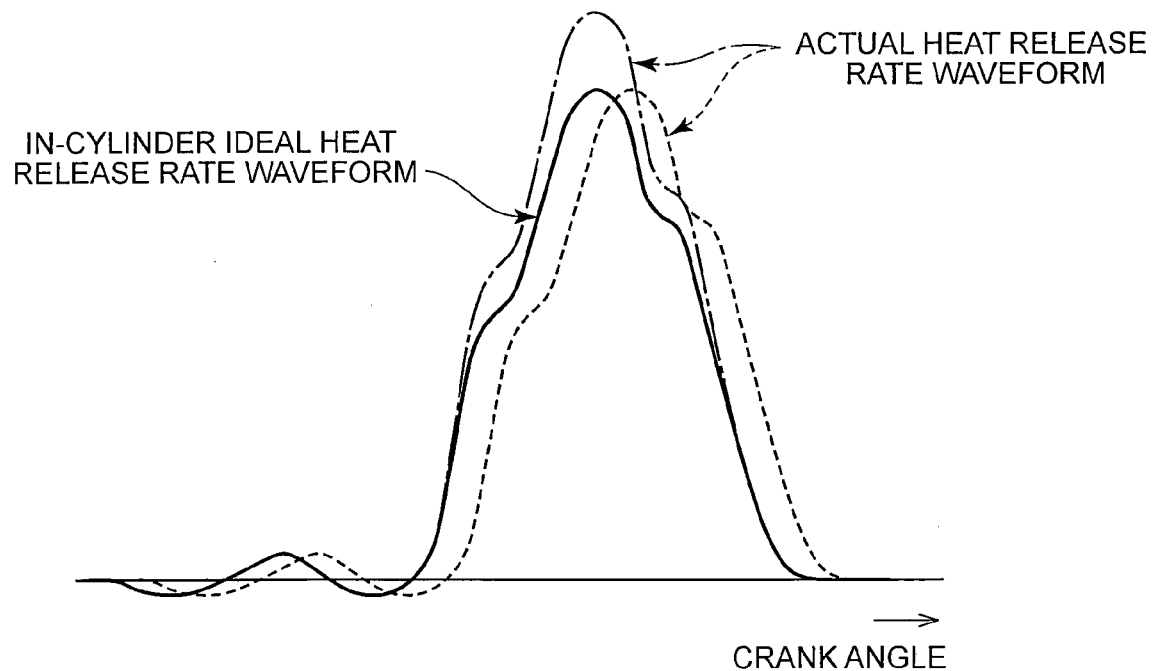
FIG. 23 is a view that shows an example of an ideal heat release rate waveform (continuous line) and actual heat release rate waveforms (dashed line and alternate long and short dashed line) in the case where fuel is injected into the cylinder once in the diesel engine.

As in the case of the actual heat release rate waveform indicated by the alternate long and short dashed line in FIG. 23, when the peak value of the heat release rate waveform in each high-temperature oxidation reaction is higher than that of the ideal heat release rate waveform indicated by the continuous line, and the deviation exceeds the threshold, it is diagnosed that there is an abnormality in each high-temperature oxidation reaction, that is, there is an abnormality in the reaction amount in each high-temperature oxidation reaction. Such a diagnosis is not limited to application to the high-temperature oxidation reactions, and is also similarly applied to each of the vaporization reaction, the low-temperature oxidation reaction and the thermal decomposition reaction.

A parameter for diagnosing whether there is an abnormality in the reaction mode is not limited to a deviation of the above-described reaction timing (delay of ignition, or the like) or a deviation of the peak value of the heat release rate waveform. The parameter may also be a deviation of the reaction rate, a deviation of the reaction period, a peak phase, or the like.

(4) In diagnosing a combustion state through a comparison between the ideal heat release rate waveform and the actual heat release rate waveform, when there is any reaction mode in which a deviation of the actual heat release rate waveform from the ideal heat release rate waveform exceeds the preset threshold as described above, it is diagnosed that there is an abnormality in that reaction mode, and the control parameter of the engine 1 is corrected such that the deviation is reduced.

For example, when the actual heat release rate waveform is the one indicated by the dashed line in FIG. 23, it is determined that there is a delay of ignition of fuel and the amount of oxygen is short, and the shortage of oxygen is resolved by increasing the cooling performance for cooling intake air with the use of the intercooler 61, reducing the EGR gas amount by decreasing the opening degree of the EGR valve 81, or increasing the supercharging rate of intake air.

When the actual heat release rate waveform is the one indicated by the alternate long and short dashed line in FIG. 23, it is determined that the reaction amount of fuel is excessively large, and, for example, the fuel injection amount is corrected so as to reduce or the EGR gas is corrected so as to increase.

Another correction operation may be such that, when the reaction start timing in the actual heat release rate waveform is retarded from that of the ideal heat release rate waveform, for example, the supercharging rate of intake air is corrected to increase or the preheating amount of the target region through the pilot injection is corrected to increase.

The control parameter for bringing the actual heat release rate waveform close to the ideal heat release rate waveform may be the fuel injection timing, the composition of gas in the cylinder, the intake air amount (gas amount) and any one of various learning values (learning values of the fuel injection amount, fuel injection timing, and the like), other than the above-described values. For example, when the oxygen density of the target region is excessive or short, learning is carried out such that the EGR gas or the supercharging rate of intake air is corrected as the learning value. When the fuel density of the target region is excessive or short, learning is carried out such that the fuel injection timing, the fuel injection pressure or the fuel injection amount is corrected as the learning value.

Such a correction of the control parameter is carried out when it is possible to bring the actual heat release rate waveform into substantial coincidence with the ideal heat release rate waveform by correcting the control parameter. Specifically, correcting the control parameter is carried out when the deviation of the actual heat release rate waveform from the ideal heat release rate waveform is smaller than or equal to a predetermined correctable deviation. The correctable deviation is set in advance through an experiment or simulation. When the deviation of the actual heat release rate waveform from the ideal heat release rate waveform exceeds the correctable deviation, the correction amount of the control parameter exceeds a predetermined limit value, so it is diagnosed that there is a failure in part of the devices that constitute the engine 1 accordingly. Specifically, a lower limit value of each of the in-cylinder temperature, oxygen density and fuel density is set in advance, and when any one of these in-cylinder temperature, oxygen density and fuel density is lower than the corresponding lower limit value, it is determined that the correction amount of the control parameter of the engine 1 exceeds the predetermined limit value, and it is diagnosed that there is a failure in the engine 1.

In this case, without correcting the control parameter, for example, an MIL (alarm lamp) on a meter panel in a vehicle cabin is caused to turn on to alarm a driver, and abnormality information is written in a diagnosis provided in the ECU 100.

As described above, in the present embodiment, the inside of the cylinder is divided into the intra-cavity region and the extra-cavity region, and the heat release rate waveform is generated for each region. That is, for each of the intra-cavity region and the extra-cavity region that may be different from each other in the physical quantity, such as temperature and fuel density, the reaction state of fuel injected to each region is individually obtained on the basis of an environment in that region, and the ideal heat release rate waveform is generated individually. Therefore, in comparison with the existing technique for determining a combustion state (heat release rate waveform) by uniforming the gas temperature, or the like, of all the inside of the cylinder, it is possible to further accurately determine the reaction state of fuel in each region, so it is possible to obtain high reliability on the generated ideal heat release rate waveform. In the present embodiment, the ideal heat release rate waveform for all the inside of the cylinder is generated by combining these ideal heat release rate waveforms together, and the combustion state is diagnosed by utilizing the ideal heat release rate waveform. Therefore, for each of the plurality of reaction modes of fuel, when the actual heat release rate waveform deviates from the ideal heat release rate waveform by a predetermined amount or larger, it is allowed to be diagnosed that there is an abnormality in that reaction mode. That is, each reaction mode is allowed to be individually treated, and it is allowed to be diagnosed whether there is an abnormality in each reaction mode. Therefore, it is possible to highly accurately identify the reaction mode having an abnormality, so it is possible to improve the accuracy of diagnosis. By taking a remedial measure (correcting the control parameter) for the reaction mode diagnosed to be abnormal (when the deviation is smaller than or equal to the predetermined correctable deviation), it is allowed to correct a suitable control parameter for optimizing the reaction state of that reaction mode, so effective correction operation is performed. Thus, it is possible to bring each of the reactions of fuel close to the corresponding ideal reaction (bring the actual heat release rate waveform of each reaction to the corresponding ideal heat release rate waveform), so it is possible to significantly improve the controllability of the engine 1.

When it is diagnosed that there is an abnormality in a reaction, it is determined whether the abnormality is resolvable on the basis of the deviation of the actual heat release rate waveform from the ideal heat release rate waveform, so it is possible to accurately distinguish a state where a normal reaction state is obtained by correcting the control parameter from a state where maintenance, such as replacement of parts, is required.

Next, a second embodiment will be described. In the present embodiment, each of the extra-cavity region and the intra-cavity region is further subdivided, an ideal heat release rate waveform model is generated for each of the subdivided regions, ideal heat release rate waveforms are generated by filtering the ideal heat release rate waveform models. Hereinafter, description will be specifically made.

When the injection amount of fuel injected from the injector 23 is relatively large, main spray (spray mass) reaches to a region far from the injector 23 because of its penetration force.

For example, when fuel is injected to the extra-cavity region, the fuel reaches to near the wall face of the cylinder bore 12 because of its penetration force. Therefore, the fuel density of spray is relatively low at a portion around the injector 23, and the fuel density of spray is relatively high at an outer peripheral side (the wall face side of the cylinder bore 12).

Similarly, when fuel is injected to the intra-cavity region, the fuel reaches to near the inner wall face of the cavity 13b because of its penetration force. Therefore, the fuel density of spray is relatively low at a portion around the injector 23, and the fuel density of spray is relatively high at an outer peripheral side (at the inner wall face side of the cavity 13b).

Figure 24:
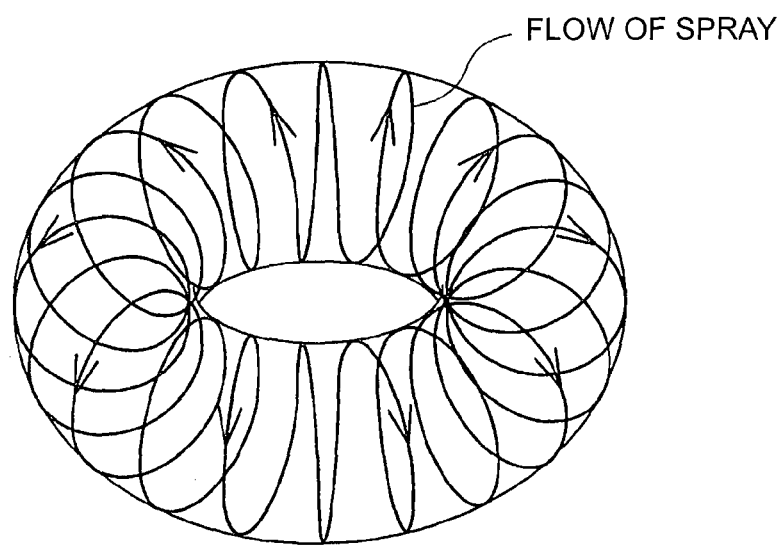
FIG. 24 is a schematic view that shows flow of spray in the case where fuel is injected into the intra-cavity region in the diesel engine.

FIG. 24 is a schematic view that shows the flow of spray in the case where fuel has been injected to the intra-cavity region. Swirl flow (swirl flow around a cylinder axis) along the flow of intake air from the intake port 15a and squish flow (flow that pushes fuel from the cylinder to the inside of the cavity) due to movement of the piston 13 (movement toward the compression TDC) are occurring inside the cylinder, so spiral flow that flows in the circumferential direction around the outer periphery of the arrangement location of the injector 23 is occurring as shown in FIG. 24. The fuel density of spray is relatively high in a region in which the spiral flow is occurring; whereas the fuel density of spray is relatively low in a region' inside the region in which the spiral flow is occurring (the injector 23-side region; the center region of the combustion chamber 3). In this way, the region in which the fuel density of spray is relatively high ("intra-cavity second fuel density region" in the invention) is generated as a so-called doughnut-shaped region, and the region inside the above region ("intra-cavity first fuel density region" in the invention) is generated as a region in which the fuel density of spray is relatively low. The ratio of the amount of fuel between the region in which the fuel density is relatively high and the region in which the fuel density is relatively low is, for example, 8:2. The ratio is not limited to this value, and is obtained in advance through an experiment or simulation by using the fuel injection amount, the fuel injection pressure, the in-cylinder pressure, or the like, as a parameter.

Figure 25:
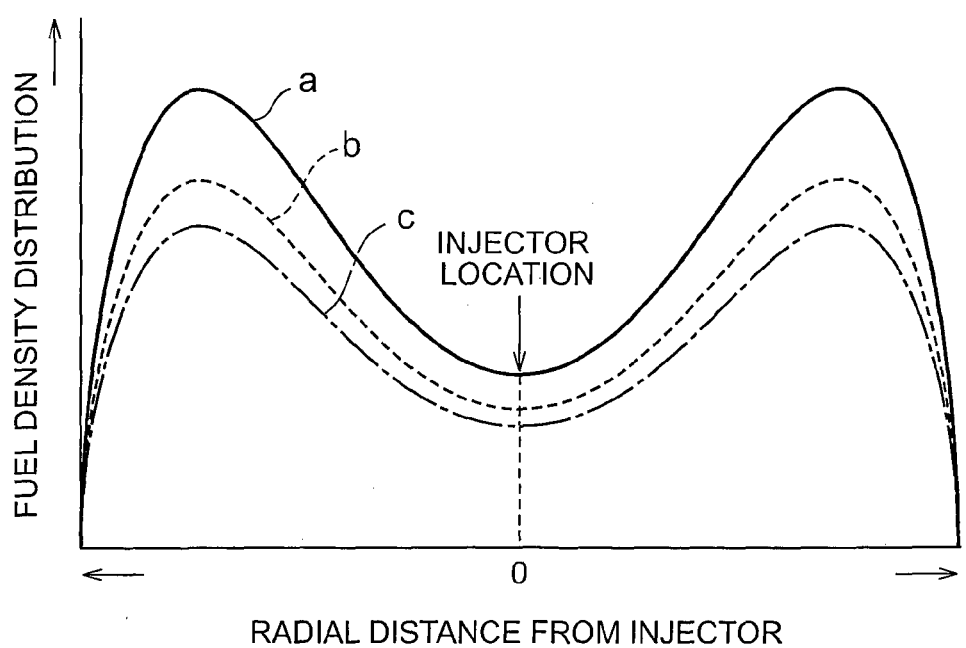
FIG. 25 is a graph that shows the correlation between a distance from the injector and a fuel density distribution in the diesel engine.

FIG. 25 is a graph that shows the correlation between a distance from the injector 23 and a fuel density distribution in the case where fuel has been injected to the intra-cavity region. In the graph, the fuel injection amount reduces in order of the continuous line a, the dashed line b and the alternate long and short dashed line c. As is apparent from this drawing, the fuel density of spray is relatively low in a center region inside the cavity, which is near the injector 23. In contrast, the fuel density of spray is relatively high in an outer peripheral region inside the cavity, which is a region far from the injector 23.

Figure 26:
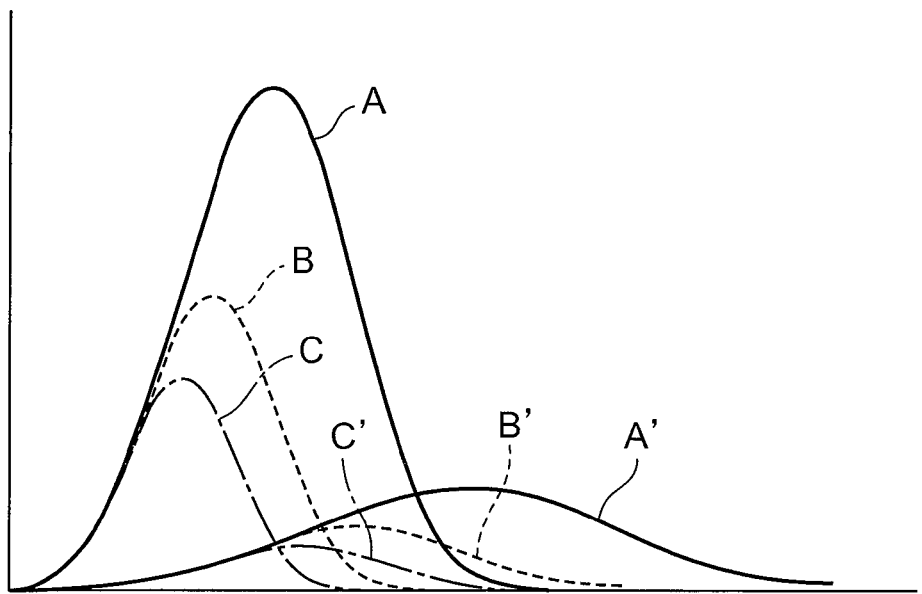
FIG. 26 is a graph that shows a heat release rate waveform resulting from combustion in a near-injector region and a heat release rate waveform resulting from combustion at the outer peripheral side of the near-injector region in the diesel engine.

FIG. 26 is a graph that shows a heat release rate waveform resulting from combustion in the near-injector region in this case and a heat release rate waveform resulting from combustion at the outer peripheral side of the near-injector region. The continuous line A in FIG. 26 indicates the heat release rate waveform in the outer peripheral region inside the cavity (region in which the fuel density, of spray is high) in the case of the injection amount indicated by the continuous line a shown in FIG. 25. The dashed line B indicates the heat release rate waveform in the outer peripheral region inside the cavity in the case of the injection amount indicated by the dashed line b in FIG. 25. The alternate long and short dashed line C indicates the heat release rate waveform in the outer peripheral region inside the cavity in the case of the injection amount indicated by the alternate long and short dashed line c in FIG. 25. The continuous line A' in FIG. 26 indicates the heat release rate waveform in the center region inside the cavity (region in which the fuel density of spray is low) in the case of the injection amount indicated by the continuous line a. The dashed line B' indicates the heat release rate waveform in the center region inside the cavity in the case of the injection amount indicated by the dashed line b. The alternate long and short dashed line C' indicates the heat release rate waveform in the center region inside the cavity in the case of the injection amount indicated by the alternate long and short dashed line c.

Figure 27:
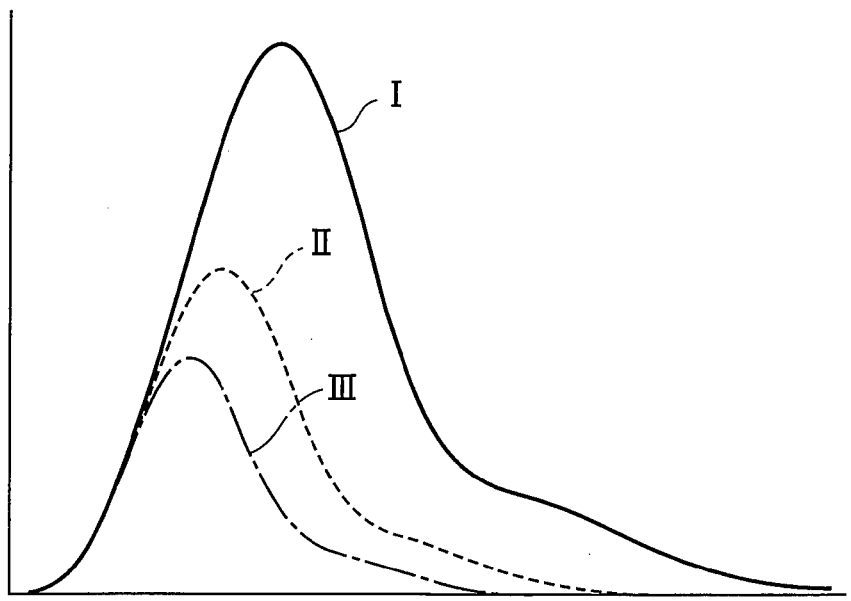
FIG. 27 is a graph that shows a heat release rate waveform that is obtained by combining the heat release rate waveforms shown in FIG. 26.

FIG. 27 is a graph that shows a heat release rate waveform that is obtained by combining the heat release rate waveforms shown in FIG. 26. In FIG. 27, the continuous line I indicates the combined heat release rate waveform in the case of the injection amount indicated by the continuous line a shown in FIG. 25, the dashed line II indicates the heat release rate waveform in the case of the injection amount indicated by the dashed line b, and the alternate long and short dashed line III indicates the heat release rate waveform in the case of the injection amount indicated by the alternate long and short dashed line c.

In this way, combustion is steep in the outer peripheral region inside the cavity in which the fuel density of spray is high; whereas combustion is slow in the center region inside the cavity in which the fuel density of spray is low.

Substantially similar flow is occurring in the case where fuel is injected toward the extra-cavity region as well, and there are a region in which the fuel density is relatively high (outer peripheral region; "extra-cavity second fuel density region" in the invention) and a region in which the fuel density is relatively low (inner peripheral region; "extra-cavity first fuel density region" in the invention). A combustion state in each region is also similar to the case where fuel is injected toward the intra-cavity region.

The region in which the fuel density is relatively high and the region in which the fuel density is relatively low are formed in this way when the penetration force of the fuel is relatively large and the air distance of fuel is relatively long. The penetration force of fuel increases when the valve open period of the injector 23 is longer than a predetermined period. That is, this is the case where the fuel injection amount, is relatively large. Therefore, the region in which the fuel density is relatively high and the region in which the fuel density is relatively low are formed at the time of fuel injection in the fuel injection amount larger than or equal to a predetermined amount (for example, larger than or equal to 10 $mm^3$).

In the present embodiment, in consideration of the fact that there are the region in which the fuel density of spray is relatively high (hereinafter, referred to as high fuel density region) and the region in which the fuel density of spray is relatively low (hereinafter, referred to as low fuel density region) in the target region in this way, when fuel is injected to the extra-cavity region, the ideal heat release rate waveform models are generated as in the case of the above description for the high fuel density region and the low fuel density region in the extra-cavity region, and the ideal heat release rate waveforms are generated by filtering these ideal heat release rate waveform models (filtering). When fuel is injected to the intra-cavity region, the ideal heat release rate waveform models are generated as in the case of the above description for the high fuel density region and the low fuel density region in the intra-cavity region, and the ideal heat release rate waveforms are generated by filtering these ideal heat release rate waveform models (filtering). That is, when fuel is injected to both the extra-cavity region and the intra-cavity region, the inside of the cylinder is divided into four regions, and these regions are individually treated, and the ideal heat release rate waveforms are respectively generated for the four regions.

The ideal heat release rate waveform for all the inside of the cylinder is generated by combining the ideal heat release rate waveforms individually generated for these regions (for example, four regions).

The operation of generating the ideal heat release rate waveform models, the operation of generating the ideal heat release rate waveforms by filtering these ideal heat release rate waveform models, the operation of combining the ideal heat release rate waveforms, the operation of diagnosing a combustion state through a comparison between the ideal heat release rate waveform and the actual heat release rate waveform, and correcting the control parameter of the engine 1 on the basis of the diagnosed result, are similar to those of the first embodiment, so the description is omitted here.

According to the present embodiment, it is possible to further subdivide each of the extra-cavity region and the intra-cavity region and determine the reaction mode of fuel in each of the regions (for example, the four regions). Therefore, it is possible to obtain further high reliability on the ideal heat release rate waveform for all the inside of the cylinder, obtained by combining the ideal heat release rate waveforms of these regions. As a result, it is possible to improve the reliability of diagnosis of a combustion state.

Next, a third embodiment will be described. In the first embodiment and the second embodiment, generating the ideal heat release rate waveform in the case where the fuel injection amount is larger than or equal to the predetermined amount is described. In the present embodiment, generating the ideal heat release rate waveform in the case where the fuel injection amount is smaller than the predetermined amount, that is, the case where the injection amount is small, will be described.

When the injection amount is small (for example, smaller than 10 mm$^3$), the penetration force of fuel injected from the injector 23 is small, so the air distance of fuel is also short. Therefore, the volume of the region in which spray is formed also reduces.

In the present embodiment, at the time of generating the ideal heat release rate waveform model, when the fuel injection amount is smaller than the predetermined amount, the region in which spray is formed is treated as having a reduced size.

Figure 28:
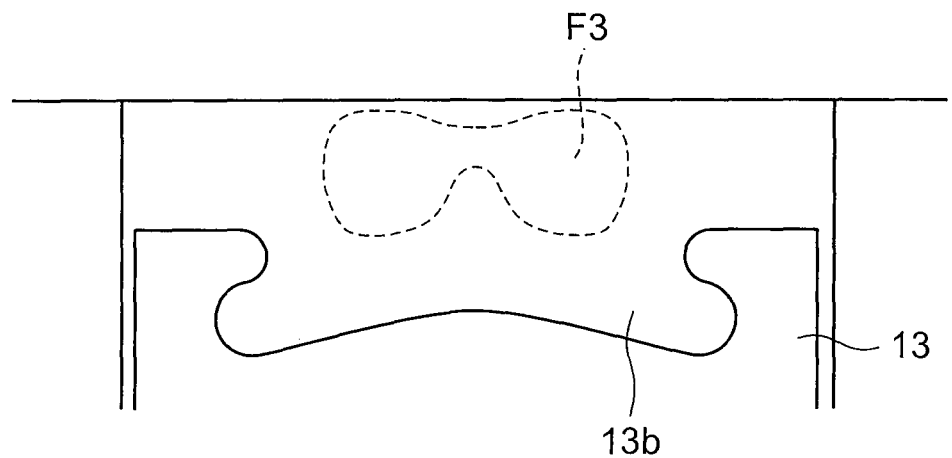
FIG. 28 is a view that shows a region in which spray is present in the case where the piston has moved to near the compression TDC in a state where fuel in a small injection amount has been injected into the extra-cavity region in the diesel engine.
Figure 29:
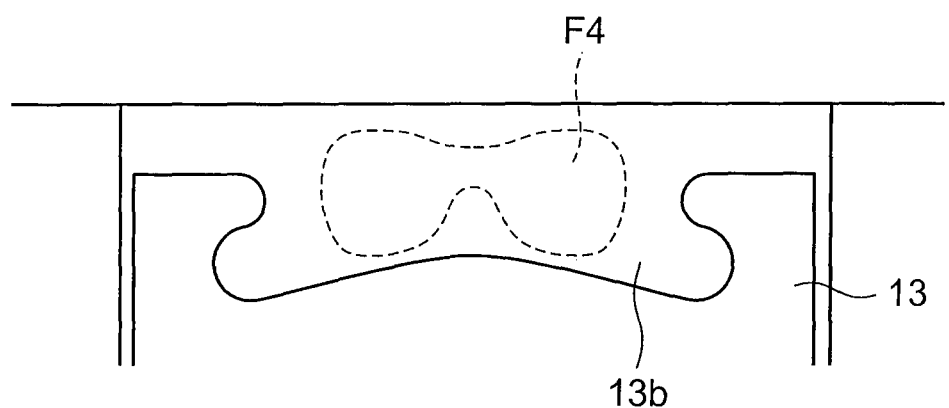
FIG. 29 is a view that shows a region in which spray is present in the case where the piston has moved to near the compression TDC in a state where fuel in a small injection amount has been injected into the intra-cavity region in the diesel engine.

FIG. 28 shows a region in which spray is present (spray is present in a region F3 surrounded by the dashed line in FIG. 28) at the time when the piston 13 has moved to near the compression TDC in a state where fuel in a small injection amount has been injected to the extra-cavity region, that is, when fuel in a small injection amount has been injected at advance timing. FIG. 29 shows a region in which spray is present (spray is present in a region F4 surrounded by the dashed line in FIG. 29) at the time when the piston 13 has moved to near the compression TDC in a state where fuel in a small injection amount has been injected to the intra-cavity region, that is, fuel in a small injection amount has been injected at retardation timing (retarded from the timing shown in FIG. 28).

When the injection amount is small as in the case of the present embodiment, even when fuel has been injected to the intra-cavity region, the spray mass diffuses without receiving the influence of the inner wall face of the cavity 13b (without a collision with the inner wall face of the cavity 13b). Therefore, even when fuel has been injected to the intra-cavity region, an air-fuel mixture having a relatively low density combusts, so the combustion is slow. That is, in this case, there is almost no difference in combustion mode due to a spray density between the case where fuel has been injected to the extra-cavity region and the case where fuel has been injected to the intra-cavity region, and a difference in combustion mode occurs due to the temperature and oxygen density of each region. Therefore, in generating the ideal heat release rate waveform model, the ideal heat release rate waveform model is generated for each reaction mode on the basis of these temperature and oxygen density. Other than the above, the operation of generating the ideal heat release rate waveforms by filtering the ideal heat release rate waveform models, the operation of combining the ideal heat release rate waveforms, the operation of diagnosing a combustion state through a comparison between the ideal heat release rate waveform and the actual heat release rate waveform, and correcting the control parameter of the engine 1 on the basis of the diagnosed result, are similar to those of the first embodiment, so the description is omitted here.

In the case where the injection amount is small as in the case of the present embodiment as well, as well as the case of the second embodiment, the inside of the cylinder may be subdivided into the region near the injector 23, in which the fuel density is relatively low, and the region on the outer peripheral side of the above region, in which the fuel density is relatively high, and the heat release rate waveform may be individually generated for each region.

The above-described embodiments are cases where the invention is applied to the in-line four-cylinder diesel engine 1 mounted on an automobile. Hereinafter, another embodiment of the invention will be described. The invention is not limited to an engine used in an automobile, and may also be applied to an engine that is used in another application. The number of cylinders or the engine type (such as an in-line engine, a V-engine and a horizontally' opposed engine) is not specifically limited.

In the above-described embodiments, the combustion state diagnostic system according to the invention is stored in the ROM of the in-vehicle ECU 100 (implemented in the vehicle), and the combustion state is diagnosed on the basis of the operating state of the engine 1. The invention is not limited to this configuration. The invention is also applicable to a usage mode in which the combustion state diagnostic system is provided in an experimental apparatus (engine bench tester) and an optimal value of the control parameter is acquired by diagnosing a combustion state at the time of test operation of the engine on the experimental apparatus in the design stage of the engine 1.

In the first embodiment, the ideal heat release rate waveform is generated for each of the extra-cavity region and the intra-cavity region, and these are combined with each other and utilized for diagnosis of a combustion state. In the second embodiment, the ideal heat release rate waveforms are respectively generated for the high fuel density region and the low fuel density region in each of the extra-cavity region and the intra-cavity region, and these are combined with each other and utilized for diagnosis of a combustion state. The invention is not limited to these configurations. The ideal heat release rate waveform generated for each region may be individually used for diagnosis of a combustion state or may be utilized to design the engine or obtain an optimal value of the control parameter.

In the above-described embodiments, the engine 1 to which the piezoelectric injectors 23, each of which changes its fuel injection rate by entering a fully valve open state only in an energization period, is described. Instead, the invention is also applicable to an engine that applies variable injection rate injectors.

The invention is applicable to generating the heat release rate waveform in each reaction of fuel and diagnosing each reaction in the diesel engine mounted on an automobile.

The invention claimed is:

1. A heat release rate waveform generating device for a compression self-ignition internal combustion engine that carries out self-ignition combustion of fuel injected from a fuel injection valve into a cylinder, the heat release rate waveform generating device comprising:
an electronic control unit configured to:
(a) divide an inside of the cylinder into an internal region inside a cavity provided in a piston and an external region outside the cavity,
(b) generate an ideal heat release rate waveform for at least one of the regions, the fuel injected from the fuel injection valve being present in the region,
(c) generate the ideal heat release rate waveform for the internal region inside the cavity when the fuel injected from the fuel injection valve is present only in the internal region inside the cavity,
(d) generate the ideal heat release rate waveform for the external region outside the cavity when the fuel injected from the fuel injection valve is present only in the external region outside the cavity, and
(e) individually generate the ideal heat release rate waveform for each of the internal region inside the cavity and the external region outside the cavity when the fuel injected from the fuel injection valve is present in both the internal region inside the cavity and the external region outside the cavity.

2. The heat release rate waveform generating device according to claim 1, wherein
the electronic control unit is configured to generate the ideal heat release rate waveform by obtaining a reaction state of the fuel in the at least one of the regions, the fuel being present in the region, on the basis of an environment in the region.

3. The heat release rate waveform generating device according to claim 1, wherein
the electronic control unit is configured to generate the ideal heat release rate waveform by calculating a reaction rate, a reaction amount and a reaction period of each of a plurality of reactions of the fuel injected from the fuel injection valve for the at least one of the internal region inside the cavity and the external region outside the cavity, the injected fuel being present in the region, on the basis of an environment in the region.

4. The heat release rate waveform generating device according to claim 3, wherein
the plurality of reactions of the fuel include a vaporization reaction, a low-temperature oxidation reaction, a thermal decomposition reaction and a high-temperature oxidation reaction.

5. The heat release rate waveform generating device according to claim 3, wherein
the electronic control unit is configured to further divide the internal region inside the cavity into an intra-cavity first fuel density region that is a region near the fuel injection valve and an intra-cavity second fuel density region that is a region farther from the fuel injection valve than the intra-cavity first fuel density region, and
the electronic control unit is configured to obtain an ideal heat release rate waveform by calculating a reaction rate, a reaction amount and a reaction period of each reaction for each of these intra-cavity first fuel density region and intra-cavity second fuel density region on the basis of the environment inside the corresponding region.

6. The heat release rate waveform generating device according to claim 3, wherein
the electronic control unit is configured to further divide the external region outside the cavity into an extra-cavity first fuel density region that is a region near the fuel injection valve and an extra-cavity second fuel density region that is a region farther from the fuel injection valve than the extra-cavity first fuel density region, and
the electronic control unit is configured to obtain an ideal heat release rate waveform by calculating a reaction rate, a reaction amount and a reaction period of each reaction for each of these extra-cavity first fuel density region and extra-cavity second fuel density region on the basis of the environment in the corresponding region.

7. The heat release rate waveform generating device according to claim 1, wherein
the electronic control unit is configured to generate the ideal heat release rate waveform for all the inside of the cylinder by combining ideal heat release rate waveforms of the regions for which the corresponding ideal heat release rate waveform is obtained.

8. The heat release rate waveform generating device according to claim 1, wherein
the electronic control unit is configured to obtain an amount of suspended unburned fuel in at least one of the regions, the fuel injected from the fuel injection valve being present in the region, and
the electronic control unit is configured to generate the ideal heat release rate waveform by obtaining a reaction state of the fuel based on an environment in the region on the basis of an effective amount of the fuel, the effective amount of the fuel being obtained by subtracting the amount of the suspended unburned fuel from an amount of the fuel in the region, the fuel being present in the region.

9. The heat release rate waveform generating device according to claim 3, wherein
the electronic control unit is configured to set reaction start temperatures as reaction start points of the respective reactions in advance, and
the electronic control unit is configured to set start timing of each reaction to timing at which a temperature in a target one of the internal region inside the cavity and the external region outside the cavity has reached the reaction start temperature in the corresponding region.

10. The heat release rate waveform generating device according to claim 9, wherein
the electronic control unit is configured to calculate the reaction rate from a reference- reaction rate efficiency and an amount of the fuel, the reference reaction rate efficiency corresponding to the reaction start temperature at the start timing of the reaction,
the electronic control unit is configured to calculate the reaction amount from a reference reaction amount efficiency and the amount of the fuel, the reference reaction amount efficiency corresponding to the reaction start temperature, and
the electronic control unit is configured to calculate the reaction period from the reaction rate and the reaction amount.

11. The heat release rate waveform generating device according to claim 10, wherein the electronic control unit is configured to obtain the reaction rate by multiplying the reference reaction rate by a rotation speed correction coefficient based on an engine rotation speed, the reference reaction rate being obtained by multiplying the reference reaction rate efficiency by the amount of the fuel, and the electronic control unit is configured to obtain the rotation speed correction coefficient by using following formula:

Rotational speed correction coefficient =(Reference rotation speed/Actual rotation speed)$^2$.

12. The heat release rate waveform generating, device according to claim 3, wherein the electronic control unit is configured to generate the ideal heat release rate waveform by generating ideal heat release rate waveform models, each of the ideal heat release rate waveform models being formed of a triangle in which a gradient of each oblique line is the reaction rate, an area is the reaction amount and a length of a base is the reaction period, a start timing of each reaction being set for a base point, and the ideal heat release rate waveform being generated by smoothing the ideal heat release rate waveform models of the reactions by filtering.

13. The heat release rate waveform generating device according to claim 3, wherein the electronic control unit is configured to set a precedence order of a condition for determining a reaction state of the fuel such that the precedence order becomes higher as a control flexibility decreases, the precedence order being an order of a temperature in the region, an amount of oxygen in the region and an amount of fuel in the region.

14. A combustion state diagnostic system for an internal combustion engine, comprising:

an electronic control unit configured to:
(a) divide an inside of a cylinder into an internal region inside a cavity provided in a piston and an external region outside the cavity,
(b) generate an ideal heat release rate waveform for at least one of the regions, fuel injected from a fuel injection valve being present in the region,
(c) generate the ideal heat release rate waveform for the internal region inside the cavity when the fuel injected from the fuel injection valve is present only in the internal region inside the cavity,
(d) generate the ideal heat release rate waveform for the external region outside the cavity when the fuel injected from the fuel injection valve is present only in the external region outside the cavity,
(e) individually generate the ideal heat release rate waveform for each of the internal region inside the cavity and the external region outside the cavity when the fuel injected from the fuel injection valve is present in both the internal region inside the cavity and the external region outside the cavity,
(f) compare the ideal heat release rate waveform with an actual heat release rate waveform at a time when the fuel has actually reacted in the cylinder, and
(g) diagnose that there is an abnormality in a reaction of the fuel when a deviation of the actual heat release rate waveform from the ideal heat release rate waveform is larger than or equal to a predetermined amount.

15. A combustion state diagnostic system for an internal combustion engine, comprising:

an electronic control unit configured to:
(a) divide an inside of a cylinder into an internal region inside a cavity provided in a piston and an external region outside the cavity,
(b) generate an ideal heat release rate waveform for at least one of the regions, fuel injected from a fuel injection valve being present in the region,
(c) generate the ideal heat release rate waveform for the internal region inside the cavity when the fuel injected from the fuel injection valve is present only in the internal region inside the cavity,
(d) generate the ideal heat release rate waveform for the external region outside the cavity when the fuel injected from the fuel injection valve is present only in the external region outside the cavity,
(e) individually generate the ideal heat release rate waveform for each of the internal region inside the cavity and the external region outside the cavity when the fuel injected from the fuel injection valve is resent in both the internal region inside the cavity and the external region outside the cavity,
(f) generate the ideal heat release rate waveform by calculating a reaction rate, a reaction amount and a reaction period of each of a plurality of reactions of the fuel injected from the fuel injection valve for the at least one of the internal region inside the cavity and the external region outside the cavity, the injected fuel being present in the region, on the basis of an environment in the region,
(g) compare the ideal heat release rate waveform with an actual heat release rate waveform at a time when the fuel has actually reacted in the cylinder in each of the reactions, and
(h) diagnose that there is an abnormality in the reaction when there is the reaction in which a deviation of the actual heat release rate waveform from the ideal heat release rate waveform is larger than or equal to a predetermined amount.

16. The combustion state diagnostic system according to claim 14, wherein the electronic control unit is configured to obtain the actual heat release rate waveform on the basis of an in-cylinder pressure, the in-cylinder pressure being detected by an in-cylinder pressure sensor.

17. The combustion state diagnostic system according to claim 15, wherein at a time when there is the reaction in which the deviation of the actual heat release rate waveform from the ideal heat release rate waveform is larger than or equal to a predetermined abnormality determination deviation and the electronic control unit has diagnosed that there is an abnormality in that reaction, the electronic control unit is configured to execute control for reducing the deviation to a deviation below the abnormality determination deviation by correcting a control parameter of the internal combustion engine when the deviation of the actual heat release rate waveform from the ideal heat release rate waveform is smaller than or equal to a predetermined correctable deviation, and the electronic control unit is configured to diagnose that there is a failure, in the internal combustion engine when the deviation of the actual heat release rate waveform from the ideal heat release rate waveform exceeds the correctable deviation.

18. The combustion state diagnostic system according to claim 14, wherein the combustion state diagnostic system is implemented in a vehicle or mounted on an experimental apparatus.

19. The combustion state diagnostic system according to claim 15, wherein
the electronic control unit is configured to obtain the actual heat release rate waveform on the basis of an in-cylinder pressure, the in-cylinder pressure being detected by an in-cylinder pressure sensor.

20. The combustion state diagnostic system according to claim 15, wherein
the combustion state diagnostic system is implemented in a vehicle or mounted on an experimental apparatus.

\* \* \* \* \*